(12) United States Patent
Kojima

(10) Patent No.: US 9,223,015 B2
(45) Date of Patent: Dec. 29, 2015

(54) INTERFERENCE REJECTION DEVICE, RADAR DEVICE, AND TARGET FINDING METHOD

(71) Applicant: FURUNO Electric Company Limited, Nishinomiya, Hyogo (JP)

(72) Inventor: Tatsuya Kojima, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 302 days.

(21) Appl. No.: 13/920,710

(22) Filed: Jun. 18, 2013

(65) Prior Publication Data
US 2013/0342383 A1    Dec. 26, 2013

(30) Foreign Application Priority Data
Jun. 21, 2012 (JP) .................................. 2012-139905

(51) Int. Cl.
| | | |
|---|---|---|
| *G01S 13/10* | (2006.01) | |
| *G01S 7/02* | (2006.01) | |
| *G01S 13/28* | (2006.01) | |
| *G01S 7/292* | (2006.01) | |
| *G01S 13/93* | (2006.01) | |

(52) U.S. Cl.
CPC ................ *G01S 13/10* (2013.01); *G01S 7/023* (2013.01); *G01S 13/28* (2013.01); *G01S 7/2926* (2013.01); *G01S 7/2927* (2013.01); *G01S 13/9307* (2013.01)

(58) Field of Classification Search
CPC ..... G01S 13/10; G01S 13/28; G01S 13/9307; G01S 7/023; G01S 7/2926; G01S 7/2927
USPC ........................................................ 342/134
See application file for complete search history.

(56) References Cited

U.S. PATENT DOCUMENTS

| | | | | |
|---|---|---|---|---|
| 4,680,588 A | * | 7/1987 | Cantwell ............... | G01S 7/2928 342/26 R |
| 5,410,621 A | * | 4/1995 | Hyatt ........................... | 382/260 |
| 2011/0298651 A1 | * | 12/2011 | Nakagawa et al. .......... | 342/146 |

FOREIGN PATENT DOCUMENTS

JP        2008-096337 A        4/2008

* cited by examiner

*Primary Examiner* — Timothy A Brainard
(74) *Attorney, Agent, or Firm* — Global IP Counselors, LLP

(57) ABSTRACT

An interference rejection device includes a change amount calculator, a detector, and a rejecter. The change amount calculator is configured to find change amounts in at least one of amplitude and phase of received signals of a plurality of sweeps in a distance direction between a first distance and a second distance. The detector is configured to detect radar interference occurring between the first distance and the second distance by comparing the change amounts calculated by the change amount calculator between the plurality of sweeps. The rejecter is configured to reduce the amplitude of the received signal corresponding to a position of the radar interference.

17 Claims, 17 Drawing Sheets

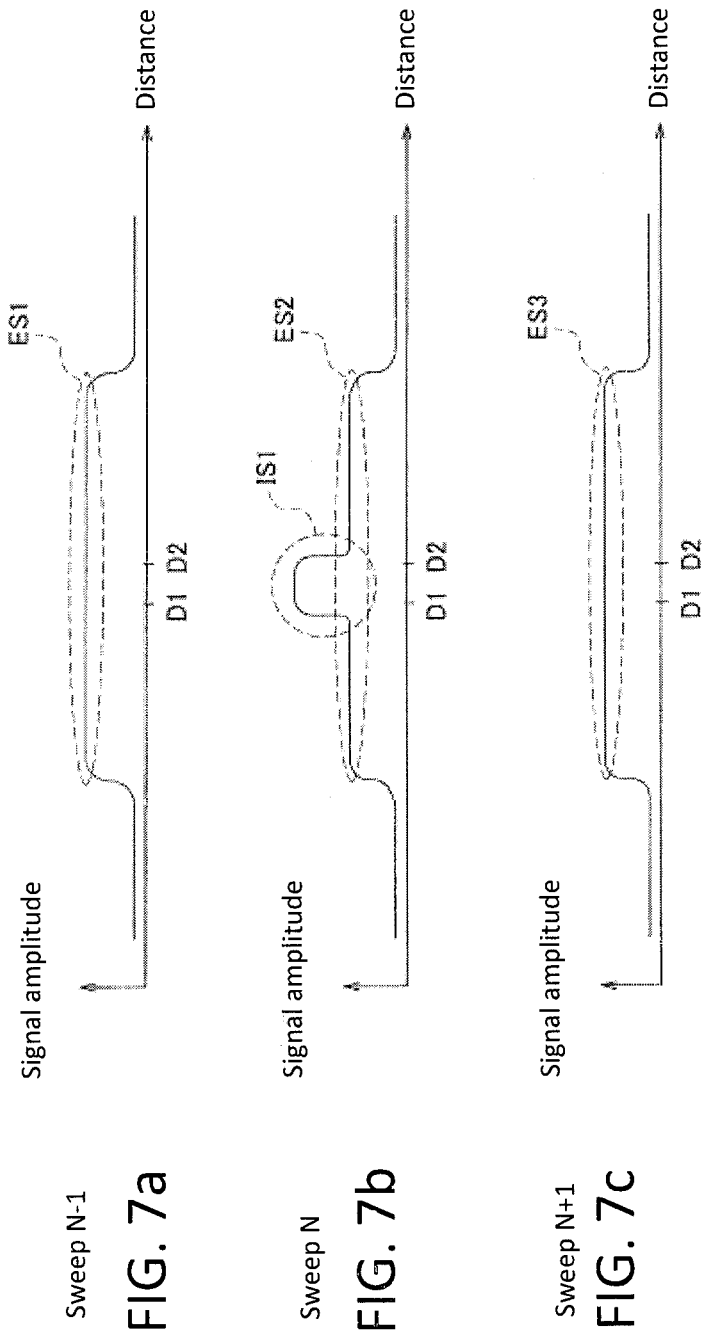

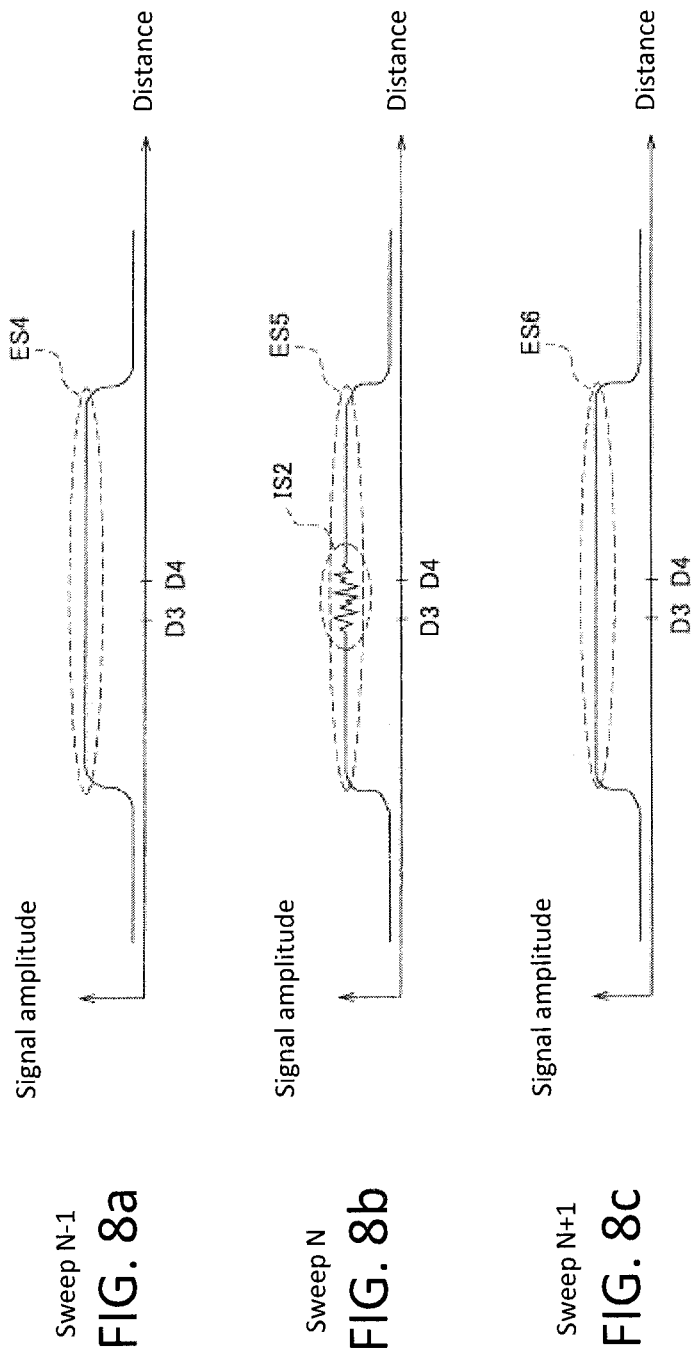

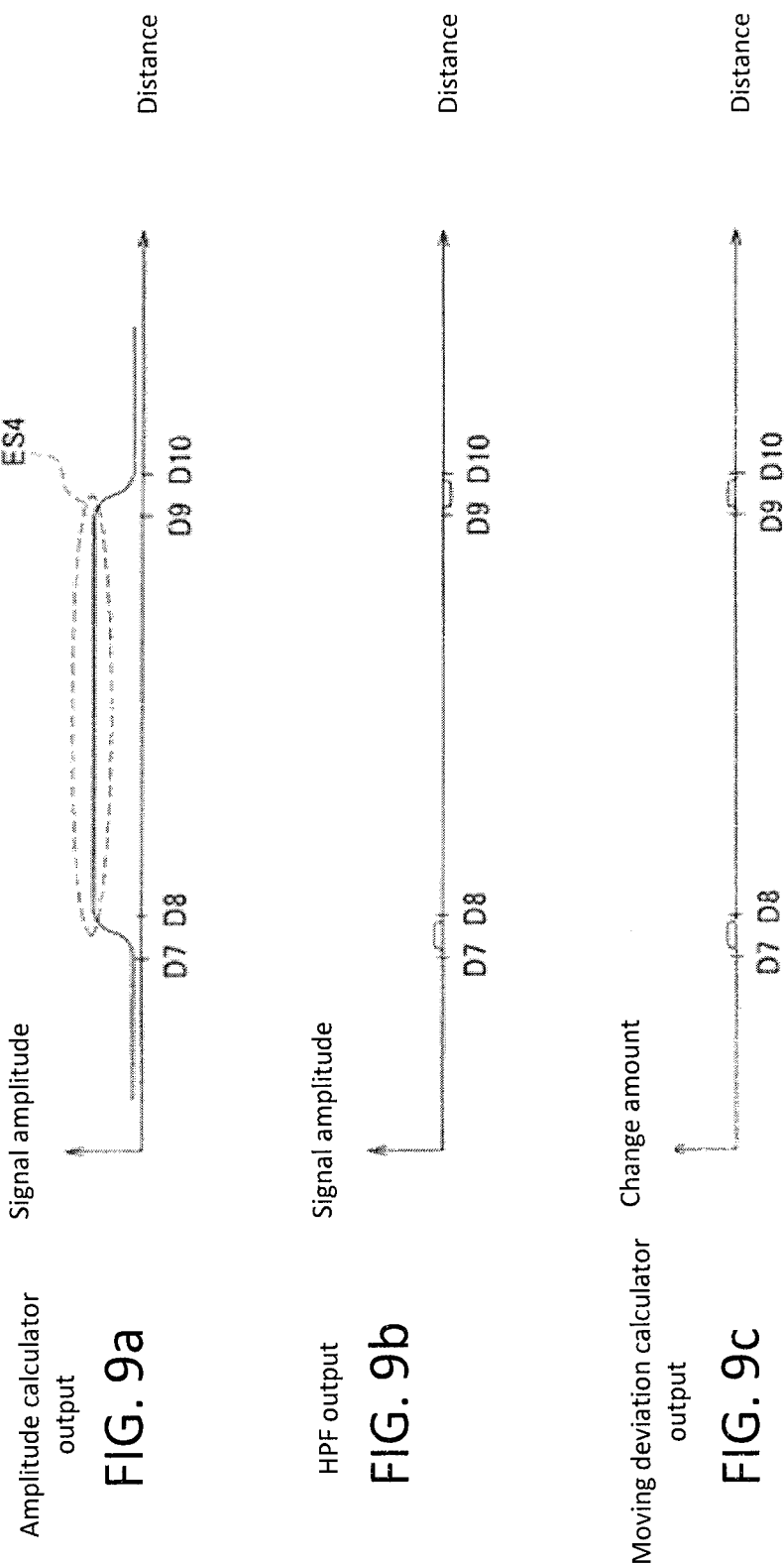

Amplitude calculator output

HPF output

Moving deviation calculator output

INTERFERENCE REJECTION DEVICE, RADAR DEVICE, AND TARGET FINDING METHOD

CROSS-REFERENCE TO RELATED APPLICATIONS

This application claims priority to Japanese Patent Application No. 2012-139905 filed on Jun. 21, 2012. The entire disclosure of Japanese Patent Application No. 2012-139905 is hereby incorporated herein by reference.

BACKGROUND

1. Field of the Invention

The present invention relates to an interference rejection device that rejects radar interference occurring between a plurality of radar devices, and to a radar device equipped with an interference rejection device, and to an interference rejection method for rejecting radar interference.

2. Background Information

A conventional marine radar transmits a sine wave pulse by using a magnetron. The amplitude of the interference signal produced when this radar (hereinafter referred to as a magnetron radar) is affected by another magnetron radar (such as a radar installed on a nearby ship) is far greater than the amplitude of a signal pertaining to a wave reflected from a target (hereinafter referred to as an echo signal). With the conventional magnetron radar, the effect of this interference signal is suppressed based on received signals from a plurality of continuous sweeps. For example, the amplitudes of the received signals at a given distance and obtained in three continuous sweeps are compared, the minimum value is selected, and this minimum value is used as the amplitude of a target sweep out of the three times.

In recent years, however, a pulse compression radar, in which a semiconductor amplifier is used instead of a magnetron to transmit a modulated pulse, has begun to see practical use as marine radar. With the pulse compression radar, a pulse with a longer time width T than that of magnetron radar is transmitted, and the received signal is put through a matched filter (hereinafter abbreviated as MF) corresponding to this transmitted pulse, which compresses the pulse width and also increases the signal-to-noise ratio (S/N). When an interference signal from magnetron radar undergoes this processing, it is expanded to about the same as the time width T of the interference signal. Furthermore, if an interference signal from a pulse compression radar of the same type as that installed on another ship undergoes MF processing, the time width of the interference signal will expand to about 2T. Therefore, with the pulse compression radar, it is preferable to reject any interference signals prior to MF processing.

However, if the interference rejection processing discussed above is applied to the pulse compression radar, not only the interference signal, but also the echo signal will end up being changed, so the following distortion occurs in the MF output.
   a. The peak level is reduced.
   b. The pulse width is increased (resolution is degraded).
   c. There is an increase in range side lobes.

To solve these problems, various devices and methods have been proposed in which an interference signal is detected from a signal prior to MF processing in a pulse compression radar, and just the interference signal is selectively rejected, as discussed, for example, in Patent Literature 1 (Japanese Laid-Open Patent Application No. 2008-96337).

The interference rejection method discussed in Patent Literature 1 basically detects an interference signal by going through the following three procedures.

Procedure 1: The amplitude of target data, and the amplitude of reception data at a given distance in a plurality of sweeps before and after the target data are sorted by magnitude of the amplitude value.

Procedure 2: The amplitude value of a specific number reception data is multiplied by a constant to obtain a threshold for use in determining interference.

Procedure 3: The threshold is compared to the amplitude of the target data, and if the target data is greater, it is concluded that there is a disturbing wave (interference signal) in the target data.

SUMMARY

However, with the disturbance signal rejection system (interference signal rejection method) discussed in Patent Literature 1, the decision is made based only on the magnitude of the amplitude of the target data (whether or not a threshold has been exceeded), so it is difficult to detect an interference signal when the interference signal is superposed over an echo signal.

With the interference signal rejection method of Patent Literature 1, an interference signal can be detected when the amplitude of the interference signal is sufficiently greater than the amplitude of the echo signal. However, with the interference signal rejection method of Patent Literature 1, if there is little difference between the amplitude of the echo signal and the amplitude of the interference signal, the magnitude of the amplitude of the target data will be greatly influenced by the amplitude of the echo signal, and the interference signal that is superposed over the echo signal cannot be detected.

It is an object of the present invention to provide an interference rejection device, a radar device and a target finding method with which an interference signal that is superposed over an echo signal can be detected even when there is little difference between the amplitude of the echo signal and the amplitude of the interference signal.

The interference rejection device for solving the above problem includes, among other things, a change amount calculator configured to find change amounts in at least one of amplitude and phase of received signals for a plurality of sweeps in a distance direction between a first distance and a second distance, and a detector configured to detect radar interference occurring between the first distance and the second distance by comparing the change amounts calculated by the change amount calculator for the plurality of sweeps.

With this interference rejection device, since the detector compares the change amounts calculated by the change amount calculator for the plurality of sweeps in the detection of the radar interference occurring between the first distance and the second distance, the variance in the distance direction in the at least one of the amplitude and the phase that occurs when an interference signal has been superposed over an echo signal can be ascertained, and the interference signal can be detected, even when there is little difference between the at least one of the amplitude and the phase of the echo signal and the at least one of the amplitude and the phase of the interference signal.

The target finding method for solving the above problem includes, among other things, operating a processor to determine change amounts in at least one of amplitude and phase of received signals in a plurality of sweeps in a distance direction between a first distance and a second distance, and operating the processor to detect radar interference occurring between the first distance and the second distance by comparing the change amounts for the plurality of sweeps.

With this target finding method, the change amounts are compared for the plurality of sweeps in the detection of the radar interference occurring between the first distance and the second distance, so the variance in the distance direction in the at least one of the amplitude and the phase that occurs when an interference signal has been superposed over an echo signal can be ascertained, and the interference signal can be detected, even when there is little difference between the at least one of the amplitude and the phase of the echo signal and the at least one of the amplitude and the phase of the interference signal.

With the present invention, an interference signal that is superposed over an echo signal can be detected even when there is little difference between the at least one of the amplitude and the phase of the echo signal and the at least one of the amplitude and the phase of the interference signal.

BRIEF DESCRIPTION OF THE DRAWINGS

Referring now to the attached drawings which form a part of this original disclosure:

FIG. 7a is a timing chart showing an example of the amplitude on the N−1-th sweep, FIG. 7b is a timing chart showing an example of the amplitude on the N-th sweep, and FIG. 7c is a timing chart showing an example of the amplitude on the N+1-th sweep;

FIG. 8a is a timing chart showing an example of the amplitude on the N−1-th sweep, FIG. 8b is a timing chart showing an example of the amplitude on the N-th sweep, and FIG. 8c is a timing chart showing an example of the amplitude on the N+1-th sweep;

FIG. 9a is a timing chart showing an example of the amplitude of the output of an amplitude calculator, FIG. 9b is a timing chart showing an example of the amplitude of the output of the HPF, and FIG. 9c is a timing chart showing an example of the amplitude of the output of the moving deviation calculator;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
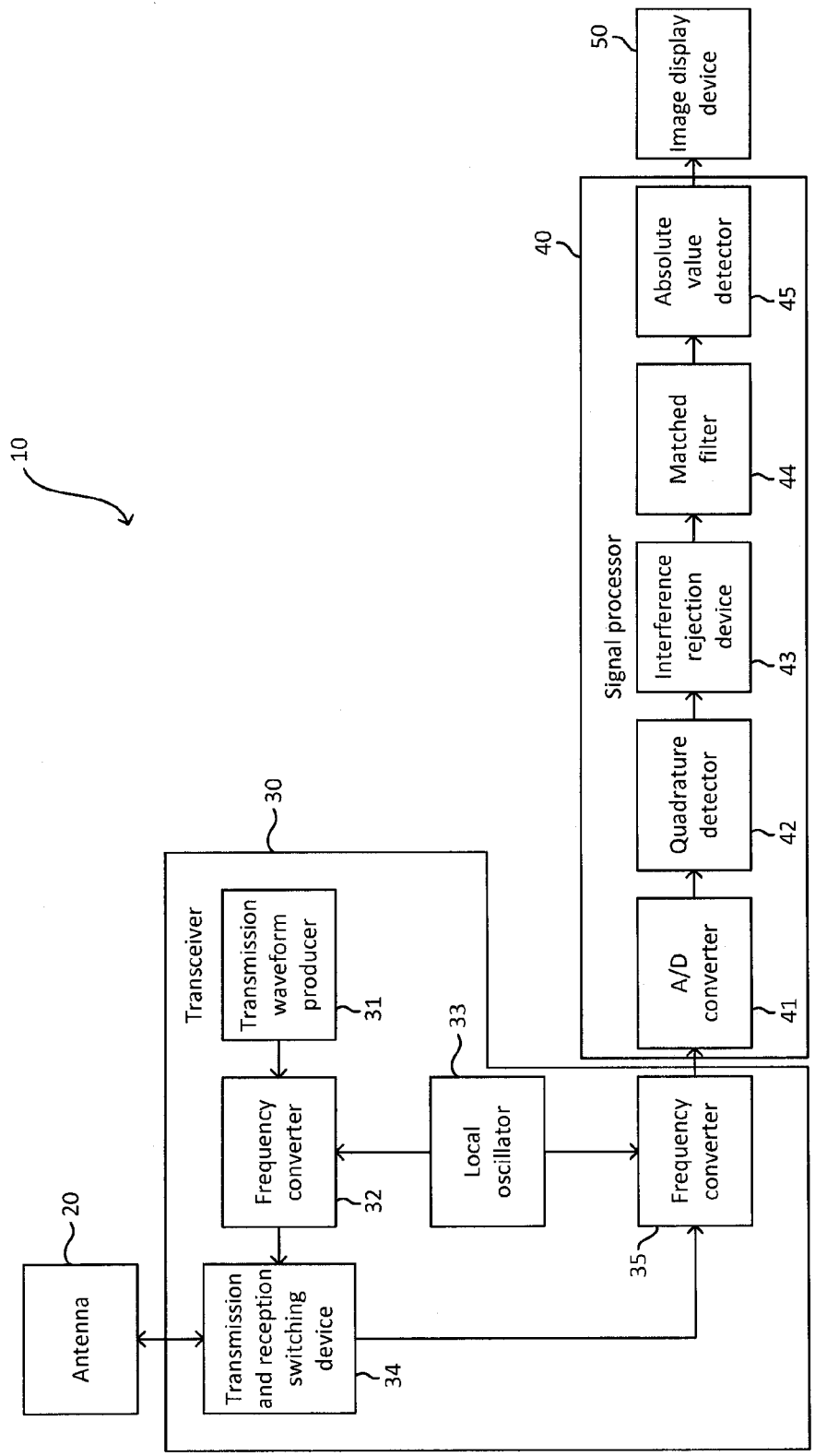
FIG. 1 is a simplified block diagram of the configuration of a pulse compression radar device in accordance with a first embodiment.

A radar device in accordance with a first embodiment of the present invention will be described through reference to the drawings. FIG. 1 is a simplified block diagram of the configuration of this pulse compression radar device (chirp radar). As shown in FIG. 1, a pulse compression radar device 10 includes an antenna 20, a transceiver 30, a signal processor 40, and an image display device 50. The pulse compression radar device 10 shown in FIG. 1 is provided to a ship, for example, and is used as a marine radar device for detecting targets such as other ships or buoys at sea, or land or the like. The pulse compression radar device 10 searches for targets using a chirp signal that has undergone frequency modulation, for example. The modulation and demodulation of pulse signals in the pulse compression radar device 10 are carried out by pulse compression processing. The various elements constituting the pulse compression radar device 10 will now be described in detail. A marine radar device is described here as an example of a radar device, but the present invention can also be applied to radar devices for other applications, such as meteorological radar or harbor surveillance radar.

Configuration of Antenna 20

The antenna 20 in this pulse compression radar device 10 sends out a beam of pulse-form radio waves having sharp directivity (a radar transmitted signal), and also receives reflected waves from targets in the surrounding area. The beam width is set to 2 degrees, for example. The antenna 20 rotates within the horizontal plane while repeating the above-mentioned transmission and reception. Its rotational speed is 24 rpm, for example. A unit of processing performed while the antenna 20 makes one rotation is called one scan. The operation of transmission and reception during the period from when the radar transmitted signal is sent out until just before the next radar transmitted signal is sent out is called a sweep. The duration of one sweep, that is, the transmission period, is 1 ms, for example.

With the antenna 20, radar received signals including reflected waves (echo signals) from targets are received by emitting the radar transmitted signals in a certain direction in a concentrated manner. In addition to the echo signal component, the radar received signals can include components such as receiver noise, clutter, or radio interference waves from other radar devices.

The distance from the antenna 20 to the target is found from the time difference between the reception time of the radar received signal including the echo signal and the transmission time of the radar transmitted signal corresponding to the radar received signal. The direction of the target is found from the direction of the antenna 20 when a corresponding radar transmitted signal is sent out.

Configuration of Transceiver 30

The transceiver 30 produces the radar transmitted signals and sends them to the antenna 20. The transceiver 30 also takes in the radar received signals from the antenna 20, and converts the frequency of the radar received signals. To this end, in this embodiment the transceiver 30 includes a transmission waveform producer 31, a frequency converter 32, a local oscillator 33, a transmission and reception switching device 34, and a frequency converter 35.

The transmission waveform producer 31 produces the radar transmitted signals of medium frequency and outputs them to the frequency converter 32 at the same or different time intervals. The radar transmitted signals produced by the transmission waveform producer 31 are chirp signals that have been modulated in order to subject the radar received signals to pulse compression processing. In the description of this embodiment, saying that transmitted signals of medium frequency are produced at the same time intervals means that the transmission period of the radar transmitted signals is constant. Also, saying that transmitted signals of medium frequency are produced at different time intervals means that the transmission period of the radar transmitted signals varies, such as when a staggered trigger system is applied. The pulse width or band width of the pulses produced by the transmission waveform producer 31 can be varied according to factors such as the display distance of the radar image set on the image display device 50.

The frequency converter 32 mixes the output signal of the transmission waveform producer 31 with a local signal outputted from the local oscillator 33, converts the frequency of the output signal of the transmission waveform producer 31, and outputs this result to the transmission and reception switching device 34. The frequency band of the output signal of the frequency converter 32 is the 3 GHz band, the 9 GHz band, etc.

The transmission and reception switching device 34 is configured so that it can be connected to the antenna 20. The transmission and reception switching device 34 switches signals between the antenna 20 and the transceiver 30. Specifically, the transmission and reception switching device 34 does not allow the radar transmitted signals to be inputted to the reception circuit (namely, the frequency converter 35) during transmission, and does not allow the radar received signals to be inputted to the transmission circuit (namely, the frequency converter 32) during reception. A circulator or other such electronic part is used as the transmission and reception switching device 34, for example.

The frequency converter 35 takes in radar received signals outputted from the antenna 20 via the transmission and reception switching device 34. The frequency converter 35 then mixes the radar received signal with a local signal outputted from the local oscillator 33, converts the output signal of the transmission and reception switching device 34 to a medium frequency, and outputs the result to the signal processor 40 at a later stage. Amplifiers, filters, and so forth are not depicted in the transceiver 30 in FIG. 1.

Configuration of Signal Processor 40

The signal processor 40 converts the radar received signal to a digital signal and performs signal processing. The digital signal that has undergone pulse compression is detected and an image signal indicating the amplitude of the radar received signal is outputted for image display. To this end, the signal processor 40 includes an A/D converter (analog to digital) 41, a quadrature detector 42, an interference rejection device 43, a matched filter 44, and an absolute value detector 45. The signal processor 40 can be realized with an ASIC (Application Specific Integrated Circuit) or other such digital circuit.

The A/D converter 41 converts the medium frequency signal with an analog value outputted from the frequency converter 35 (the transceiver 30) into a digital signal.

The quadrature detector 42 subjects the medium frequency signal with a digital value outputted from the A/D converter 41 (hereinafter referred to as the radar received signal S) to quadrature detection. The quadrature detector 42 produce an I (in-phase) signal and a Q (quadrature) signal whose phase is shifted by $\pi/2$ from the I signal, from the radar received signal S outputted by the A/D converter 41. The I signal and Q signal here (hereinafter sometimes abbreviated as "I" and "Q") are respectively a real number part and an imaginary number part of a complex envelope signal of the radar received signal. In the following, the complex envelope signal will be called simply a complex received signal. The amplitude of the complex received signal is expressed by $(I^2+Q^2)^{1/2}$, and the phase of the complex received signal is expressed by $\tan^{-1}(Q/I)$.

The interference rejection device 43 in this embodiment rejects radar interference from the output signals (I and Q) of the quadrature detector 42. However, the interference rejection device 43 can also have the function of rejecting clutter and noise in addition to radar interference.

The matched filter 44 has exactly the opposite characteristics with respect to the time-frequency characteristics of modulation performed on the transmission side of the transceiver 30.

The absolute value detector 45 finds the amplitude of the complex received signal outputted by the matched filter 44. As a result, reception data from which radar interference has been rejected is outputted from the absolute value detector 45 to the image display device 50. The reception data outputted from the absolute value detector 45 is the amplitude of the radar received signal at various positions specified by direction and distance.

Configuration of Image Display Device 50

The image display device 50 includes a CPU, a memory, an input device, and other such devices (not shown). With this image display device 50, the reception data obtained in each sweep is stored in a memory for image display, and the stored data is read out from this memory in a specific order and displayed as video on an LCD (liquid crystal display) or the like.

A radar image is usually displayed in bird's-eye view centered on the position of the radar device (antenna). The point of origin of the display corresponds to the position of the radar device. The operator of the pulse compression radar device 10 can recognize the direction and distance of a target from the position on the radar image where the amplitude of the reflected wave (echo signal) from the target is displayed. Thus, the radar received signal obtained in one scan has information about direction and distance.

Configuration of Interference Rejection Device 43

Figure 2:
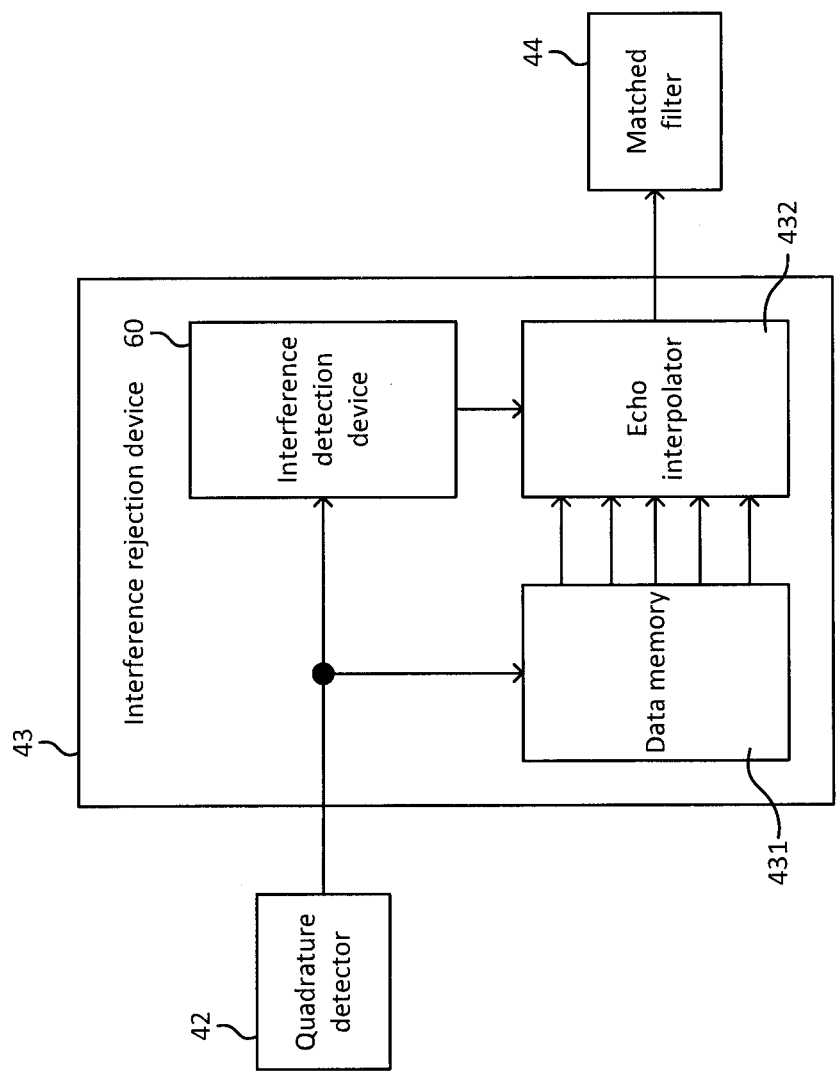
FIG. 2 is a block diagram illustrating an example of the configuration of an interference rejection device in FIG. 1.
Figure 3:
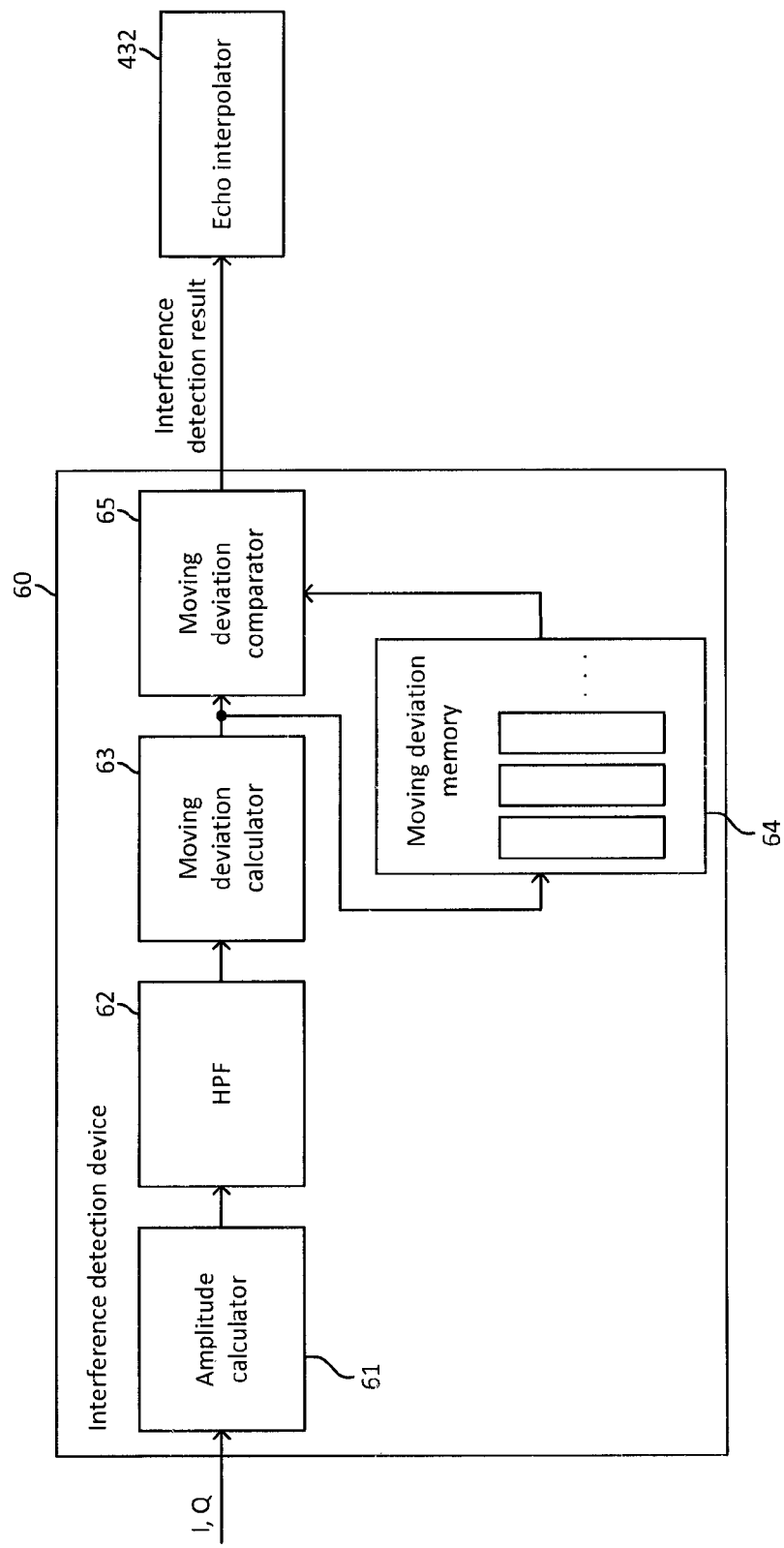
FIG. 3 is a block diagram illustrating an example of the configuration of an interference detection device in FIG. 2.

Next, the configuration of the interference rejection device 43 of the signal processor 40 will be described through reference to FIG. 2. FIG. 2 is a block diagram illustrating the configuration of the interference rejection device 43. As shown in FIG. 2, the interference rejection device 43 includes a data memory 431, an echo interpolator 432, and an interference detection device 60.

The echo interpolator 432 replaces data for which the radar interference has been detected in the interference detection device 60 with data that does not include the radar interference. For instance, data for which the radar interference has been detected is replaced by the echo interpolator 432 with data at the same distance in an adjacent sweep. For example, an average is taken for data at the same distance in sweeps before and after the target sweep to find intermediate data between the two, and an offset is added to the intermediate data so that the data in the target sweep will be smoothly linked.

The data memory 431 stores the complex received signals obtained in a plurality of the close sweeps in order to produce interpolation data at the echo interpolator 432.

Configuration of Interference Detection Device 60

The interference detection device 60 includes an amplitude calculator 61 that receives the complex received signal from the quadrature detector 42, a high-pass filter (hereinafter referred to as HPF) 62 that receives the output of the amplitude calculator 61, a moving deviation calculator 63 that receives the output of the HPF 62, a moving deviation memory 64 that receives the output of the moving deviation calculator 63, and a moving deviation comparator 65 that receives the output of the moving deviation memory 64 and the output of the moving deviation calculator 63.

The amplitude calculator 61 calculates and outputs the absolute values ($I^2+Q^2$) of the complex signals I and Q obtained by the quadrature detector 42.

Figure 4:
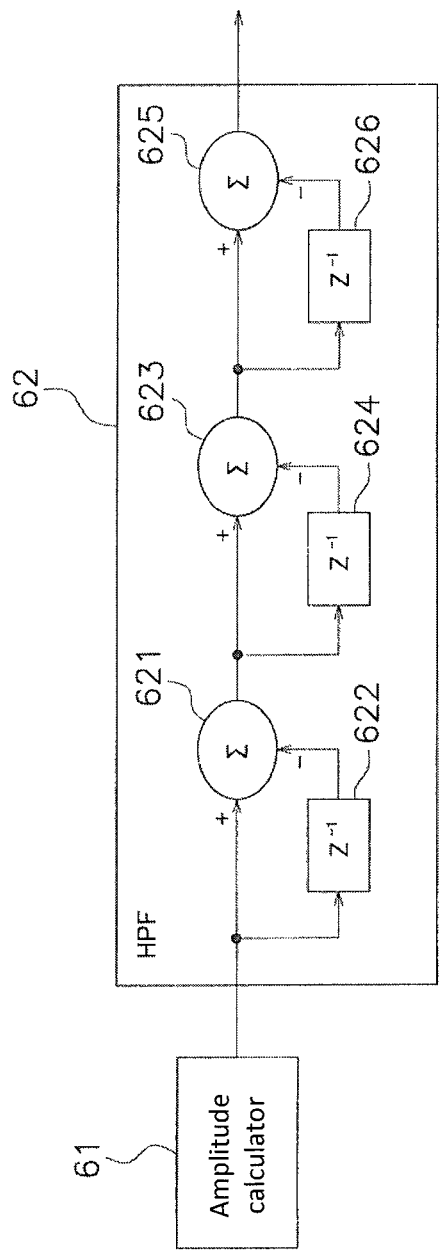
FIG. 4 is a block diagram illustrating an example of the configuration of an HPF in FIG. 3.
Figure 5:
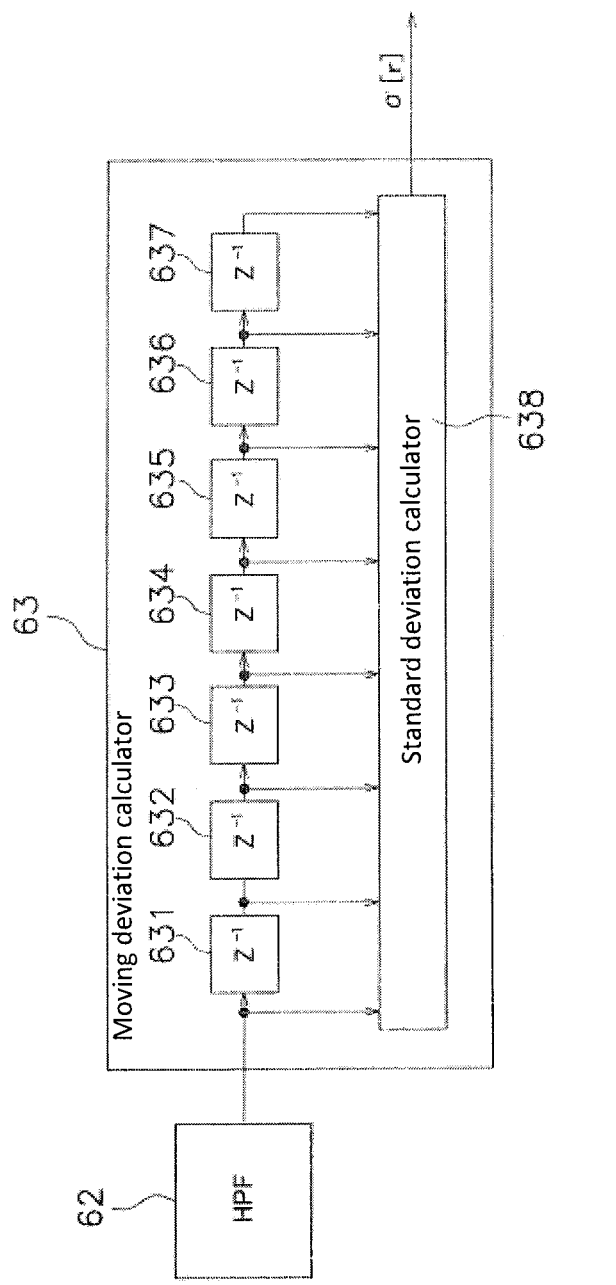
FIG. 5 is a block diagram illustrating an example of the configuration of a moving deviation calculator in FIG. 3.

The HPF 62 attenuates the frequency band lower than a specific cutoff frequency in order to make it easier to detect change in the amplitude of the portion where the radar interference is superposed over the echo signal. As shown in FIG. 4, for example, the HPF 62 can be configured by a three-stage differential filter having three adders 621, 623, and 625 and three registers 622, 624, and 626. The register 622 stores one set of data outputted from the amplitude calculator 61 to the adder 621, and the adder 621 adds to the data outputted from the amplitude calculator 61 the immediately preceding set of data outputted from the register 622. Similarly, the adder 623 adds to the data outputted from the adder 621 the immediately preceding data outputted from the adder 621 (the output of the register 624). Similarly, the adder 625 adds the two sets of data continuously outputted from the adder 623 (one being the output of the adder 623 and the other being the output of the register 626).

The impulse response of this HPF 62 is $\{1, -3, 3, -1\}$. The HPF processing of the HPF 62 allows the change in the amplitude of the portion where the radar interference is superposed over the echo signal to be emphasized. A case in which HPF processing was performed with the three-stage differential filter was described here, but the configuration can be such that the HPF processing settings can be changed, such as changing the cutoff frequency by using a four-stage differential filter or some other kind of filter, for example. Changing the settings of HPF processing can be performed for each pulse compression radar device, or for each operation of the pulse compression radar device.

The moving deviation calculator 63 calculates the moving deviation in the distance direction of the output of the HPF 62. The distance of the sweep corresponds to the time it takes from transmission to reception of a modulated pulse signal at the antenna 20, and the distance direction corresponds to the time axis. The moving deviation calculator 63 shown in FIG. 6 includes seven registers 631 to 637 and a standard deviation calculator 638.

The register 637 holds the output of the register 636, the register 636 holds that of the register 635, the register 635 holds that of the register 634, the register 634 holds that of the register 633, the register 633 holds that of the register 632, and the register 632 holds that of the register 631. Eight sets of continuous data are held by these seven registers 631 to 637.

The moving deviation calculator 63 receives the output of all seven of these registers 631 to 637 and the output of the HPF 62, and the standard deviation calculator 638 calculates the standard deviation of the eight sets of data. The standard deviation calculator 638 calculates a moving mean M from the output of the seven registers 631 to 637 and the output of the HPF 62. Then, the square of the differences between the moving mean M and the output of the registers 631 to 637 and the output of the HPF 62 is found, the square root of a value obtained by averaging the square of the differences thus found is found, and this is outputted as the standard deviation.

The moving deviation memory 64 stores the moving deviation for a number of sweeps outputted from the standard deviation calculator 638 of the moving deviation calculator 63 while associating these with distance.

The moving deviation comparator 65 compares the moving deviation of the target distance of the target sweep with the moving deviation at the same distance over the plurality of continuous sweeps. If the moving deviation of the target distance of the target sweep is prominent with respect to the moving deviation of the adjacent sweeps, it is concluded that radar interference is superposed over the target distance of the target sweep. The moving deviation is found from the following Formula 1 or Formula 3, for example. In Formulas 1 and 3, σ[r] is the standard deviation corresponding to a distance number r, and is the standard deviation found from the data at a total of N points before and after, centering around the distance r. N is the number of sets of reference data for the standard deviation. x[r] is input data to the moving deviation calculator 63 of distance number r. The bar x[r] is the average value of x[r] corresponding to the distance number r. If N is an odd number, Formulas 1 and 2 are used, and if N is an even number, Formulas 3 and 4 are used.

[Formula 1]
$$\sigma[r] = \sqrt{\frac{1}{N} \sum_{i=-\frac{N-1}{2}}^{\frac{N-1}{2}} (x[r+i] - \bar{x}[r])^2} \qquad (1)$$

[Formula 2]
$$\bar{x}[r] = \frac{1}{N} \sum_{i=-\frac{N-1}{2}}^{\frac{N-1}{2}} x[r+i] \qquad (2)$$

[Formula 3]
$$\sigma[r] = \sqrt{\frac{1}{N} \sum_{i=-\frac{N}{2}}^{\frac{N}{2}-1} (x[r+i] - \bar{x}[r])^2} \qquad (3)$$

[Formula 4]
$$\bar{x}[r] = \frac{1}{N} \sum_{i=-\frac{N}{2}}^{\frac{N}{2}-1} x[r+i] \qquad (4)$$

A variety of methods can be used to determine whether or not the moving deviation of the target distance of the target sweep is prominent with respect to the data of the sweeps adjacent to the target sweep. For instance, The deviation $\sigma_n$ of the target distance of the target sweep is compared with the average value $(\sigma_{n-1}+\sigma_{n+1})/2$ of the deviation values ($\sigma_{n-1}$ and $\sigma_{n+1}$) for the sweeps before and after at the same distance. If the deviation value $\sigma_n$ of the target distance of the target sweep is greater than the product obtained by multiplying this average value by an interference detection coefficient co, it is concluded that the radar interference is superposed.

In order for there to be no mistaken detection of the radar interference when data sets for which the deviation value is extremely small (noise) are compared, if the deviation value is less than a lower limit, the comparison is halted at the moving deviation comparator 65 and it is concluded that no radar interference is superposed.

Operation in Interference Detection

Next, the operation for detecting interference by using the signal waveforms shown in FIGS. 7 and 8 will be described through reference to the flowchart in FIG. 6. FIGS. 7 and 8 show signal waveforms in which the radar interference appears in the N-th sweep.

The radar interference shown in FIG. 7 can be detected by the conventional method such as the one discussed in Patent Literature 1, since the amplitude of the interference signal IS1 is sufficiently higher than that of the echo signal ES2. On the other hand, the radar interference shown in FIG. 8 is difficult to detect by the conventional method because the amplitude of the interference signal IS2 is smaller than that of the echo signal ES5.

With the configuration shown in FIG. 1, the radar interference shown in FIG. 7 is detected by the conventional interference detection method by the interference detection device 60, although this is not depicted in the drawings or included in the description of the interference detection device 60 above. That is, the interference detection device 60 includes a configuration for carrying out the conventional interference detection method.

First, the interference detection device 60 uses the amplitude calculator 61 to calculate the amplitude (step S1). Then, radar interference is detected by using the calculated amplitude to compare the N-th sweep shown in FIG. 7b with the N-1-th sweep shown in FIG. 7a and the N+1-th sweep shown in FIG. 7c, and with the N-2-th sweep and the N+2-th sweep not shown in FIG. 7 (step S2). The interference detection device 60 is provided with a memory required for this purpose.

More specifically, from the distance D1 to the distance D2, the amplitudes are arranged in ascending order from the N-2-th sweep to the N+2-th sweep, and the third amplitude is compared with the amplitudes from the distance D1 to the distance D2 of the N-th sweep, for example. In this case, if we assume that the third-largest amplitude is the amplitude in the N-1 sweep, then the product of multiplying this amplitude (the amplitude of the echo signal ES1) by a specific constant (such as 1.3) is compared with the amplitude of the N-th sweep. As is clear from the drawings, because the amplitude of the signal in the N-th sweep (the sum of the amplitudes of the echo signal ES2 and the interference signal IS1) is large, in this case radar interference is detected between the distance D1 and the distance D2. Normally, the echo signal appears at the same distance over the plurality of sweeps, and the echo signals ES1, ES2, and ES3 appear as shown in FIG. 7.

Next, the interference detection device 60 uses the components from the above-mentioned amplitude calculator 61 to the moving deviation comparator 65 to perform radar interference detection when the amplitude of the interference signal IS2 shown in FIG. 8 is smaller than that of the echo signal ES5 (step S1 and steps S3 to S5).

The HPF 62 performs HPF processing on the output of the amplitude calculator 61 for the N-th sweep shown in FIG. 8b, the N-1-th sweep shown in FIG. 8a, and the N+1-th sweep shown in FIG. 8c, from the amplitude calculated in step S1 (step S3). The moving deviation calculator 63 calculates the moving deviation from the output of the HPF 62 for the N-1-th, the N-th, and the N+1-th sweeps (step S4). The moving deviation comparator 65 then compares the moving deviation for the N-1-th, the N-th, and the N+1-th sweeps, and detects radar interference (step S5). When the echo signals ES4, ES5, and ES6 of the N-1-th to the N+1-th sweeps are compared, there is no major difference in the amplitude values, so no interference signal is detected in step S2. If we look at the change thereof, however, the change value increases because the interference signal is superposed over the echo signal ES5, allowing the interference signal IS2 to be detected. The operation of the various components of the interference detection device 60 in the detection of the interference signal IS2 will be described below using signal waveforms, etc.

The radar interference detection result obtained in step S2 is combined with the radar interference detection result obtained in step S5, data related to the distance and the sweep at which the radar interference occurs is provided from the interference detection device 60 to the echo interpolator 432, and interpolation is performed at the echo interpolator 432.

Output of Various Components of Interference Detection Device

The output of the components of the interference detection device 60 will be described by separating into a case in which the interference signal is superposed over the echo signal and a case in which no interference signal is superposed over the echo signal. FIG. 9 is a concept diagram showing the output of the amplitude calculator 61, the output of the HPF 62, and the output of the moving deviation calculator 63 when no interference signal is superposed over the echo signal. The echo signal ES4 rises between the distance D7 and the distance D8, and falls between the distance D9 and the distance D10 (FIG. 9a). Accordingly, a signal having a positive amplitude is outputted from the HPF 62 between the distance D7 and the distance D8, and a signal having a negative amplitude is outputted between the distance D9 and the distance D10 (see FIG. 9b). That is, it can be seen that the echo signal ES4 that was between the distance D8 and the distance D9 has disappeared. The moving deviation in the output of the HPF 62 is calculated by the moving deviation calculator 63, and a certain amount of standard deviation σ is calculated between the distance D7 and the distance D8, and between the distance D9 and the distance D10 (see FIG. 9c).

FIG. 10 is a concept diagram of the output of the amplitude calculator 61, the output of the HPF 62, and the output of the moving deviation calculator 63 when the interference signal is interposed over the echo signal. Where FIG. 10 differs from FIG. 9 is that the interference signal IS2 is present. The echo signal ES5 in FIG. 10 is similar to the echo signal ES4 in FIG. 9. Therefore, the signals between the distance D7 and the distance D8 and between the distance D9 and the distance D10 that appear in the amplitude calculator 61, the HPF 62, and the moving deviation calculator 63 due to the echo signal ES5 are similar to what is shown in FIG. 9, and therefore will not be described again.

Figure 10A:
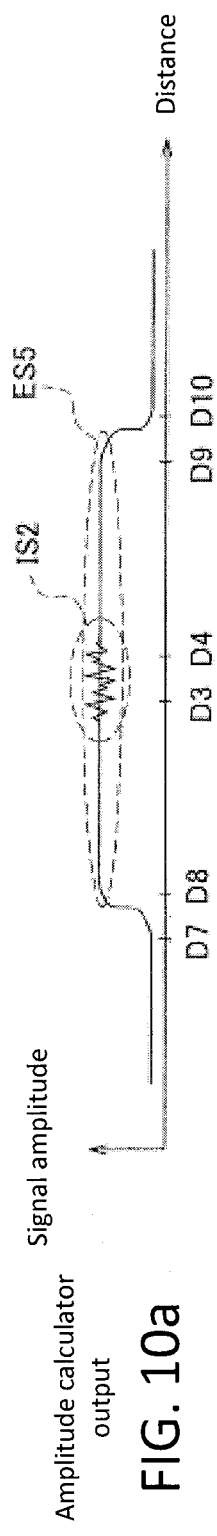
FIG. 10a is a timing chart showing an example of the amplitude of the output of the amplitude calculator.
Figure 10B:
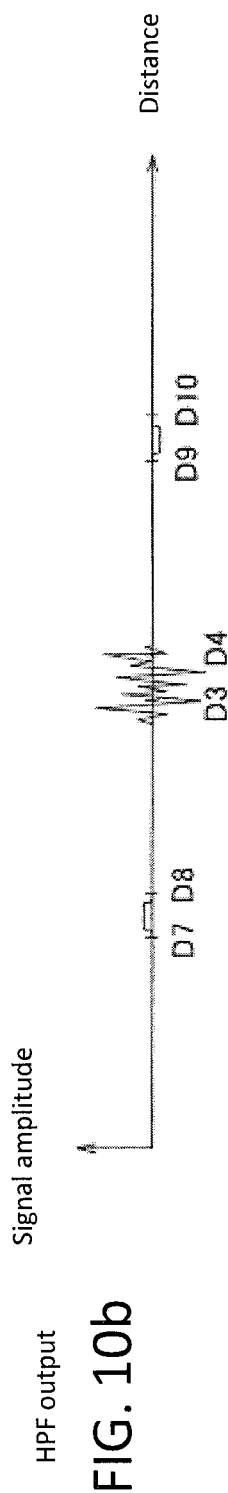
FIG. 10b is a timing chart showing an example of the amplitude of the output of the HPF.
Figure 10C:
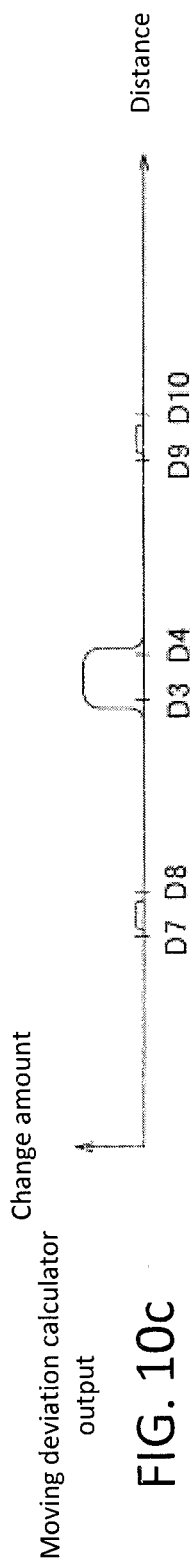
FIG. 10c is a timing chart showing an example of the amplitude of the output of the moving deviation calculator.

As shown between the distance D3 and the distance D4 in FIG. 10a, a beating phenomenon occurs when an echo and interference are present at the same time, and severe vibration with a short period is observed in which the interference signal IS2 is superposed over the echo signal ES5. Therefore, as shown in FIG. 10b, if HPF processing is performed by the HPF 62 and the low frequency is cut out, then the interference signal IS2 will be emphasized with respect to the other signal components, such as the echo signal ES5. As a result, a standard deviation σ that can be differentiated from noise or the echo signal of other sweeps appears between the distance D3 and the distance D4 in the output of the moving deviation calculator 63.

Figure 11:
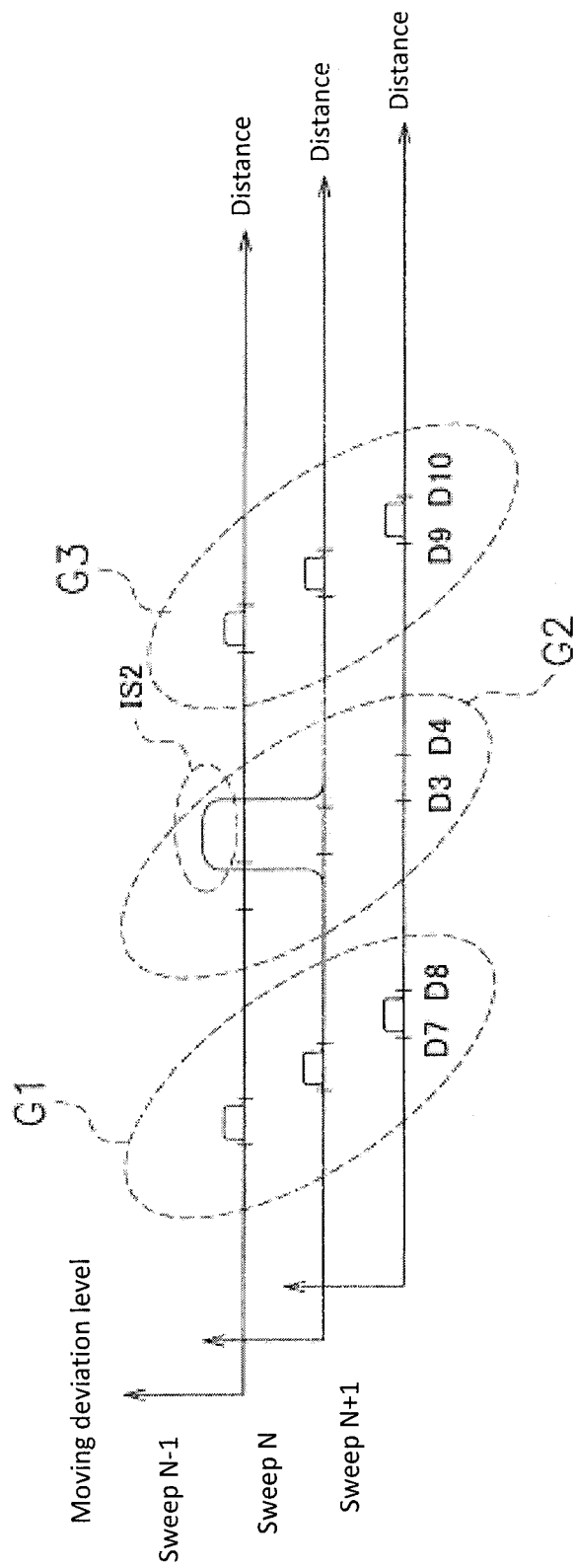
FIG. 11 is a timing chart illustrating the operation of a moving deviation comparator when there is radar interference.

FIG. 11 is a concept diagram illustrating the comparison of the standard deviation σ performed by the moving deviation comparator 65. The standard deviation σ for the N-th sweep shown in FIG. 11 corresponds to the output of the moving deviation calculator 63 shown in FIG. 10c. In FIG. 11, the N-th sweep is the target sweep for which interference is to be detected.

The group G1 shown in FIG. 11 is determined by the moving deviation comparator 65 not to include any interference because although there is a certain amount of standard deviation σ between the distance D7 and the distance D8, the standard deviation σ is about the same for the N−1-th, N-th, and N+1-th sweeps. This determination is similarly performed for the group G3. For the group G2 in which the target distance is between the distance D3 and the distance D4, only the standard deviation σ of the N-th sweep protrudes, so it can be concluded that interference has occurred between the distance D3 and the distance D4 of the N-th sweep.

More specifically, when the standard deviation σ is under a preset lower limit for the target distance (distance D3 to D4) of the target sweep (the N-th sweep), comparison by the moving deviation comparator 65 is halted and it is concluded that no radar interference has been superposed. This prevents the comparison of sets of data (noise) with extremely small deviation, and the mistaken detection of the radar interference. The standard deviation σ exceeds the lower limit between the distance D3 and the distance D4 shown in FIG. 11.

Next, the standard deviation σ for the target distance D3 to D4 of the target sweep (N-th) is compared to the average value for the standard deviation σ of the sweeps before and after at the same distance (N−1-th and N+1-th). If the standard deviation σ of the target distance of the target sweep is greater than the product of multiplying this average by an interference detection coefficient co, it is determined that radar interference has been superposed. The interference detection coefficient co is a numerical value greater than one, such as 1.25. Here, a large standard deviation σ that accompanies the interference signal IS2 appears at the target distance D3 to D4 of the target sweep (N-th), but HPF processing brings the standard deviation σ of the echo signals ES4, ES5, and ES6 to almost zero.

Features

The moving deviation calculator 63 (change amount calculator) finds the standard deviation σ (change amounts) in the distance direction of the amplitude value by using eight sets of data sampled in the distance direction from the output of the HPF 62 for the amplitude at each sweep (from the amplitude of the complex received signals for the plurality of sweeps). The moving deviation comparator 65 (detector) uses the moving deviation memory 64 to compare the standard deviation σ calculated by the moving deviation calculator 63 for the plurality of sweeps, and detects the radar interference occurring between the eight sets of data (from the first distance to the second distance).

In the detection of radar interference occurring between the eight sets of data by the moving deviation comparator 65, since the standard deviation σ calculated by the moving deviation calculator 63 is compared for the plurality of sweeps, the variance in the distance direction in the amplitude that occurs when the interference signal has been superposed over the echo signal can be ascertained, and the interference signal can be detected, even when there is only a small difference between the amplitude of the echo signal and the amplitude of the interference signal.

With the pulse compression radar device 10 in FIG. 1, it is determined whether or not the disparity between the change amount in the target sweep (the N-th sweep) and the standard deviation (change amounts) in the sweeps other than the target sweep (the N−1-th and N+1-th sweeps) has exceeded the threshold, as shown in FIG. 11, for example. This disparity in the change amounts can be not only the simple difference in the change amounts, but the difference between indices when comparing to proportion, change rate, or another such index. Thus making the determination depending on whether or not the disparity in the change amounts exceeds the threshold simplifies the configuration of the moving deviation comparator 65 (detector). In particular, the determination is made by comparing the standard deviation of the target sweep with the product of multiplying the interference detection coefficient co by the average value of the standard deviation of the N−1-th and N+1-th sweeps before and after the N-th sweep. That is, when the proportion of the change amount in the target sweep with respect to the average change amount in the sweeps before and after the target sweep exceeds a set value, it is determined that the radar interference has occurred between the distance D3 (first distance) and the distance D4 (second distance). Consequently, noise and so forth other than the interference signal is less likely to have an effect than when the difference between the standard deviation of the target sweep and the average value of the standard deviation of the sweeps before and after is found and merely compared.

With the pulse compression radar device 10 in FIG. 1, the increase in the change amount caused by superposition of the radar interference over the echo is detected from the variance in the amplitude. That is, the moving deviation calculator 63 becomes a variance detector. The moving deviation is used as an index of variance. Accordingly, whether or not there is an interference signal can be reliably determined even though there is little change in the change amount caused by superposition of the radar interference over the echo.

The average deviation, the moving root mean square, the moving variance, the moving mean square, or the moving mean value can be used as an index of variance instead of the moving standard deviation in the distance direction.

To calculate the average deviation, Formula 5 is used when N is an odd number, and Formula 6 is used when N is an even number. The symbols used in Formulas 5 and 6 are the same as those used in Formula 1 or 3.

[Formula 5]

$$\sigma[r] = \frac{1}{N} \sum_{i=-\frac{N-1}{2}}^{\frac{N-1}{2}} |x[r+i] - \bar{x}[r]| \qquad (5)$$

[Formula 6]

$$\sigma[r] = \frac{1}{N} \sum_{i=-\frac{N}{2}}^{\frac{N}{2}-1} |x[r+i] - \bar{x}[r]| \qquad (6)$$

With the pulse compression radar device 10 in FIG. 1, the time width of the interference signal is expanded double by compression processing in the matched filter 44. Accordingly, it is effective to reject the interference signal by detecting the radar interference prior to the matched filter 44.

With the pulse compression radar device 10 in FIG. 1, change other than the change amount due to superposition of the radar interference over the echo is suppressed by the HPF 62, making it easier to detect the interference signal.

Modification Example 1-1

In the above embodiment, a case in which the pulse compression radar device 10 used the chirp signal was described, but the modulated pulse signal is not limited to the chirp signal. The pulse compression radar device 10 can have the same configuration if the transmission waveform producer 31 produces a nonlinear frequency modulation signal, a code modulation signal, or another such modulation signal. In addition to the pulse compression radar device, the above method can also be applied to a radar device that makes use of unmodulated pulse signals.

Modification Example 1-2

In the above embodiment, the amplitude of the received signal was obtained from the complex received signals detected by quadrature using the amplitude calculator 61, but some other method can be used to obtain the amplitude value. For instance, the amplitude of the received signal can be obtained by performing envelope detection in which only amplitude information is taken out, or the like, and the method is not limited to one in which the amplitude is found from the absolute values of the complex received signals I and Q.

Modification Example 1-3

In the above embodiment, whether or not the standard deviation of the target sweep exceeded the threshold obtained by multiplying the interference detection coefficient by the average of the standard deviations for other sweeps was determined in order to determine that the standard deviation of the target sweep protruded beyond the standard deviation of other sweeps. However, the method for determining that the change amount in the target sweep protruded beyond the change amount in other sweeps is not limited to this method. For example, the answer can be found by a statistical method, finding the answer from the slope of a differentiated change amount, or using fuzzy logic.

Modification Example 1-4

The index for finding the increase in the change amount caused by superposition of the radar interference over the echo is not limited to the variance in the amplitude value. For instance, if a specific frequency component that increases along with the change amount caused by superposition of the radar interference over the echo is found in advance, then whether or not the change amount caused by superposition of the radar interference over the echo is increasing can be determined by detecting an increase in this specific frequency component by using a Fourier transform, a band-pass filter, or the like.

Modification Example 1-5

In the above embodiment, detecting the interference signal is made easier by using the HPF 62 to suppress change other than the change amount caused by superposition of the radar interference over the echo, but the suppression of change is not limited to just HPF processing. For instance, a band filter or other such filter can be used, or the frequency band that includes the change amount caused by superposition of the radar interference over the echo can be amplified with a high-band amplifier.

Modification Example 1-6

In the above embodiment, a case was described in which the signal processor 40 was typically configured as an integrated circuit (called an IC, system LSI, super LSI, ultra LSI, or the like depending on the degree of integration). These can individually be made into a chip, or some or all of them can be made into a single chip. The method for circuit integration is not limited to LSI, and can be realized by a dedicated circuit or a multipurpose processor. It is also possible to use an FPGA (field programmable gate array) that can be programmed after manufacture of the integrated circuit, or a reconfigurable processor that allows reconfiguration of settings or connections in circuit cells in the integrated circuit interior.

Also, the signal processor 40 can be realized by using a CPU to interpret and execute program data that can execute the above processing procedure and that is stored in a memory device (such as a ROM, RAM, or hard disk) as function blocks. This program data can be introduced into the memory device via a recording medium, or can be directly executed from the recording medium. The term "recording medium" here refers to a semiconductor memory such as a flash memory, a RAM, or a ROM, a magnetic disk memory such as a hard disk or a flexible disk, an optical memory such as CD-ROM, a DVD, or a BD, a memory card, or the like. Also, "recording medium" is a concept that also encompasses a communication medium such as a telephone line or a conveyance path.

Modification Example 1-7

Figure 12:
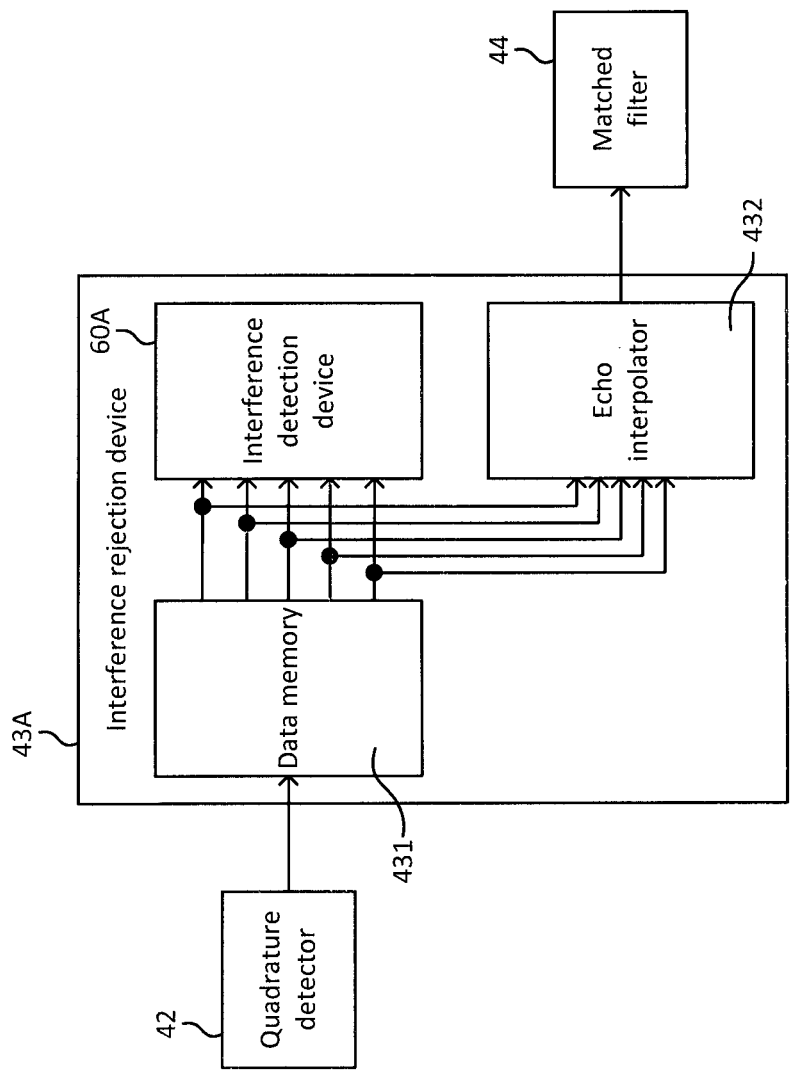
FIG. 12 is a block diagram illustrating another example of the configuration of the interference rejection device in FIG. 1.

In the above embodiment, a case was described in which the data for each sweep being sent out by the quadrature detector 42 was processed sequentially by the interference detection device 60, but the processing by the interference detection device does not have to be carried out sequentially, and as shown in FIG. 12, for example, data of a plurality of sweeps can be stored in the data memory 431 of a interference rejection device 43A, and the processing performed by a interference detection device 60A using the data of the plurality of sweeps stored in the data memory 431.

In the above embodiment, the target sweep was limited to just one, but there can be a plurality of target sweeps, and a decision made as to whether or not the average of the amplitudes thereof protrudes beyond the amplitudes of other sweeps.

Modification Example 1-8

Figure 6:
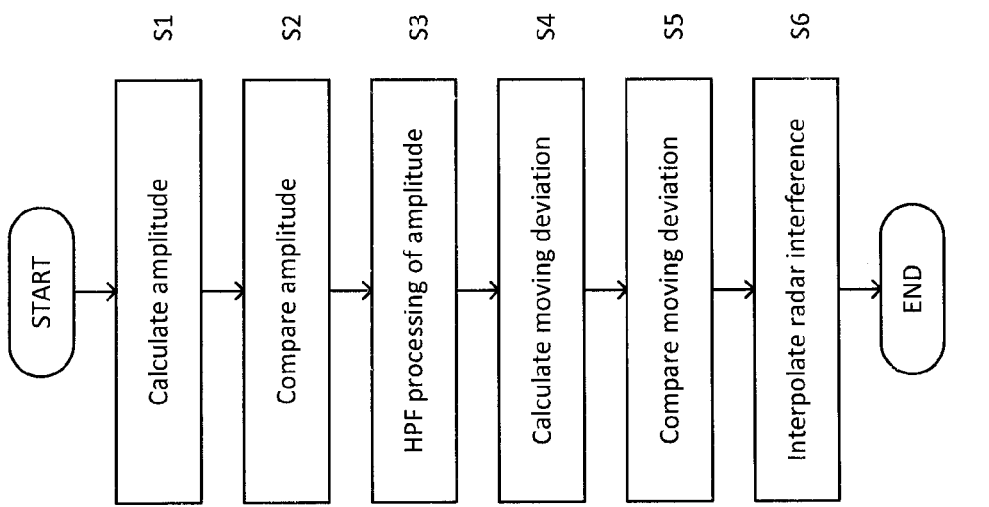
FIG. 6 is a flowchart illustrating a method for rejecting radar interference.

In the above embodiment, a case was described in which prior art was combined in the detection of the radar interference, as illustrated by the flowchart in FIG. 6, but prior art can of course not be combined, and merely used singly. Also, the technique for combining in order to detect the radar interference is not limited to just that illustrated in FIG. 6.

Second Embodiment

A radar device in accordance with a second embodiment of the present invention will be described through reference to the drawings. The pulse compression radar device in accordance with the second embodiment has the same configuration as that shown in FIG. 1, just as does the pulse compression radar device in the first embodiment.

Figure 13:
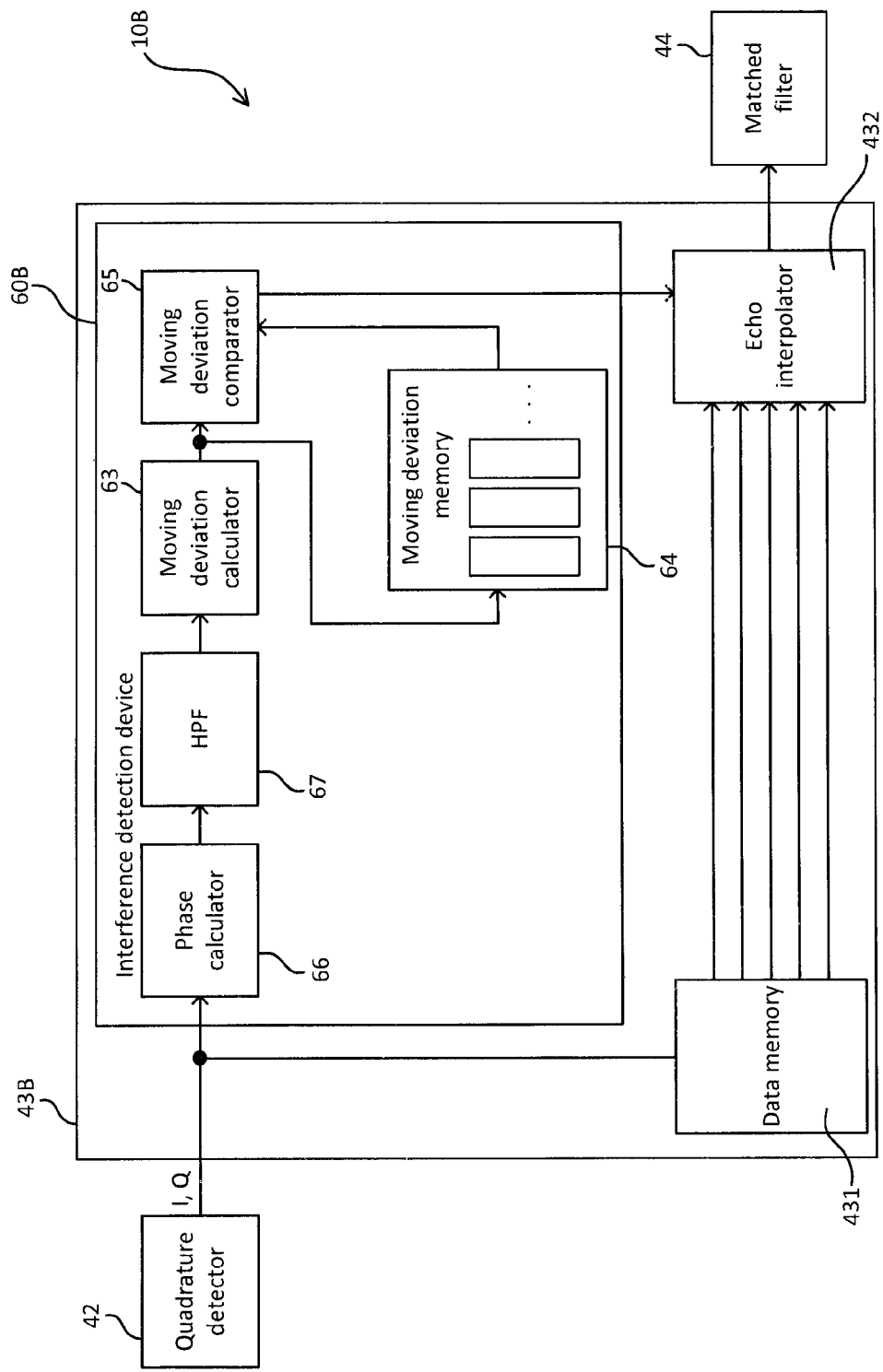
FIG. 13 is a block diagram illustrating an example of the configuration of an interference detection device in accordance with a second embodiment of the present invention.

As shown in FIG. 13, the pulse compression radar device 10B of the second embodiment differs from the pulse compression radar device 10 in the first embodiment in the configuration of a interference detection device 60B of a interference rejection device 43B. In view of this, the description of the pulse compression radar device 10B in the second embodiment will focus on the interference detection device 60B.

The pulse compression radar device 10B shown in FIG. 13 similarly includes the antenna 20, the transceiver 30, the signal processor 40, and the image display device 50 that the pulse compression radar device 10 in the first embodiment includes (see FIG. 1). The signal processor 40 of the pulse compression radar device 10B in the second embodiment similarly includes the A/D converter 41, the quadrature detector 42, the interference rejection device 43, the matched filter 44, and the absolute value detector 45 that the signal processor 40 in the first embodiment includes (see FIG. 1). The interference rejection device 43B in the second embodiment similarly includes the data memory 431 and the echo interpolator 432 that the interference rejection device 43 in the first embodiment includes (see FIG. 2), besides the interference detection device 60B. Furthermore, besides a phase calculator 66 and an HPF 67, the interference detection device 60B in the second embodiment similarly includes the moving deviation calculator 63, moving deviation memory 64 that receives the output of the moving deviation calculator 63, the moving deviation comparator 65 that receives the output of the moving deviation memory 64 and the output of the moving deviation calculator 63 that the interference detection device 60 includes in the first embodiment (see FIG. 13). Those components that are shared by the pulse compression radar device 10B of the second embodiment and the pulse compression radar device 10 of the first embodiment have the same function and therefore will not be described again.

Configuration of Interference Detection Device 60B

As shown in FIG. 13, the phase calculator 66 is what receives complex received signals from the quadrature detector 42 in the interference detection device 60B. The phase calculator 66 calculates the phase of the complex signals I and Q obtained from the quadrature detector 42, and outputs the result. The output of the phase calculator 66 goes to the HPF 67. The HPF 67 attenuates the frequency band lower than a specific cutoff frequency in order to make it easier to detect change in the phase of the portion where the radar interference is superposed over the echo signal. The output of the HPF 67 goes to the moving deviation calculator 63. The calculation of the moving deviation and the comparison of the moving deviation are the same as with the pulse compression radar device 10 in the first embodiment and therefore will not be described again.

Operation of Interference Detection

Next, the operation of interference detection will be described through reference to the flowchart in FIG. 14. With the configuration shown in FIG. 13, just as with the above-mentioned interference detection device 60, the radar interference in which the interference signal shown in FIG. 7 has the amplitude that is sufficiently larger than that of the echo signal is detected by the conventional interference detection method in the interference detection device 60B. That is, components for performing the conventional interference detection method are built into the interference detection device 60B just as in the interference detection device 60.

First, the interference detection device 60B calculates the amplitude conventionally (step S11). In parallel with this, the phase is calculated by the phase calculator 66. Then, the calculated amplitude is used to detect the radar interference by comparing the N-th sweep shown in FIG. 7b with the N−1-th sweep shown in FIG. 7a and the N+1-th sweep shown in FIG. 7c, and with the N−2-th sweep and the N+2-th sweep not shown in FIG. 7 (step S12). The interference detection device 60B is provided with a memory required for this purpose.

Next, the interference detection device 60B uses the components from the above-mentioned phase calculator 66 to the moving deviation comparator 65 to perform radar interference detection when the amplitude is smaller than that of the echo signal (step S11 and steps S13 to S15).

The HPF 67 performs HPF processing on the output of the phase calculator 66 for the N-th sweep shown in FIG. 8b, the N−1-th sweep shown in FIG. 8a, and the N+1-th sweep shown in FIG. 8c, from the phase calculated in step S11 (step S13). The moving deviation calculator 63 calculates the moving deviation for the N−1-th, the N-th, and the N+1-th sweeps from the output of the HPF 67 (step S14). The moving deviation comparator 65 compares the moving deviation for the N−1-th, the N-th, and the N+1-th sweeps, and detects the radar interference (step S15). When the echo signals ES4, ES5, and ES6 of the N−1-th to the N+1-th sweeps are compared, there is no major difference in the amplitude values, so no interference signal is detected in step S12. If we look at the change thereof, however, there is more change at a shorter period because the interference signal is superposed over the echo signal ES5, allowing the interference signal IS2 to be detected. The operation of the various components of the interference detection device 60B in the detection of the interference signal IS2 will be described below using signal waveforms, etc.

The radar interference detection result obtained in step S12 is combined with the radar interference detection result obtained in step S15, data related to the distance and the sweep at which the radar interference occurs is provided from the interference detection device 60B to the echo interpolator 432, and interpolation is performed at the echo interpolator 432.

Output of Various Components of Interference Detection Device

Figure 15:
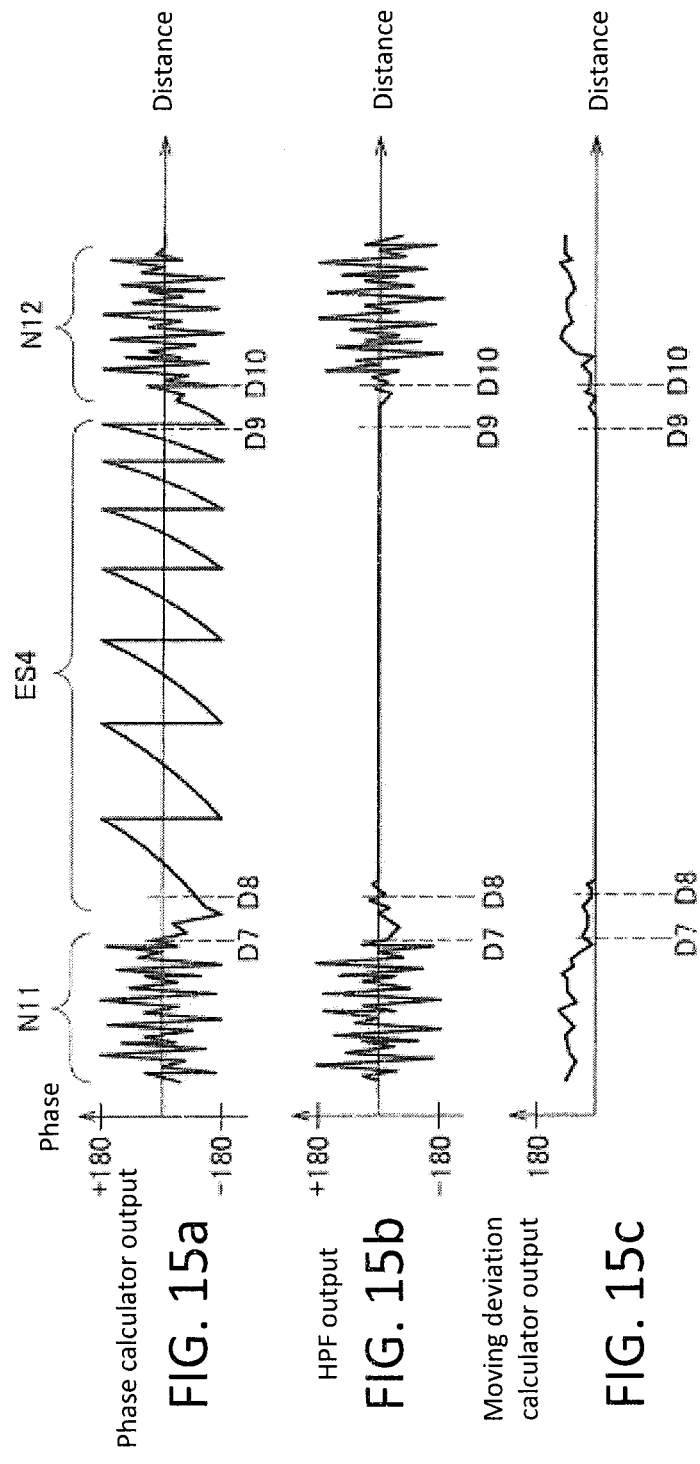
FIG. 15a is a timing chart showing an example of the phase of the output of a phase calculator.
FIG. 15b is a timing chart showing an example of the phase of the output of an HPF.
FIG. 15c is a timing chart showing an example of the phase of the output of a moving deviation calculator.

The output of the components of the interference detection device 60B will be described by separating into a case in which the interference signal is superposed over the echo signal and a case in which no interference signal is superposed over the echo signal. FIG. 15 is a concept diagram showing the output of the phase calculator 66, the output of the HPF 67, and the output of the moving deviation calculator 63 when no interference signal is superposed over the echo signal. The echo signal ES4 rises between the distance D7 and the distance D8, and falls between the distance D9 and the distance D10 (FIG. 15a). Accordingly, a change in phase caused by noise is outputted up to the distance D7 and from the distance D10 onward, and a change in phase with a relatively low frequency caused by the echo signal ES4 is eliminated between the distance D8 and the distance D9. That is, the echo signal ES4 that was between the distance D8 and the distance D9 is eliminated (see FIG. 15b). The moving deviation calculator 63 calculates the moving deviation of this output of the HPF 67, and a large standard deviation σ is calculated up to the distance D8 and from the distance D9 onward (see FIG. 15c). Meanwhile, the noise N11 and N12 remains (see FIG. 15c), the amplitude of the noise N11 and N12 is small (see FIG. 15c), and the noise N11 and N12 is not misidentified as the interference signals.

Figure 16:
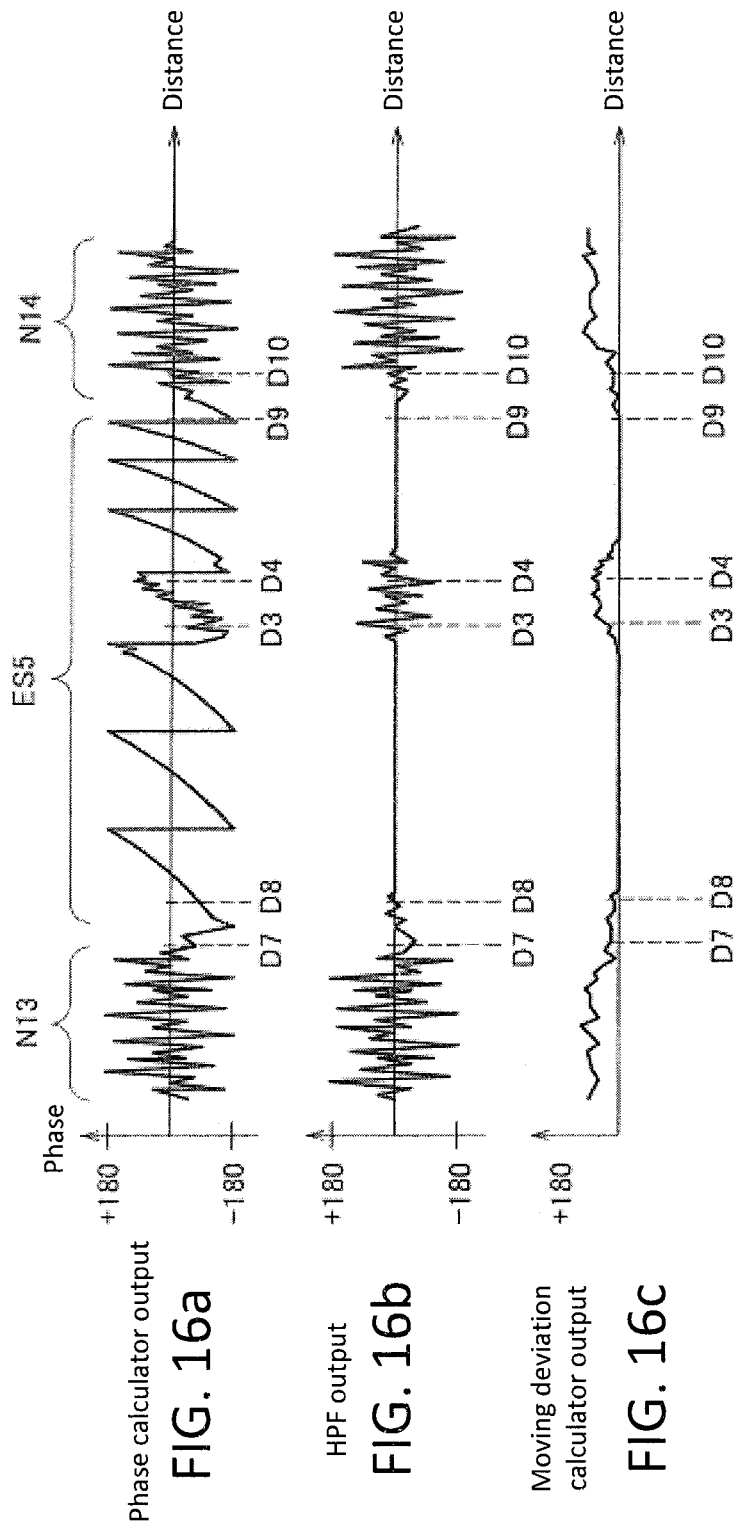
FIG. 16a is a timing chart showing an example of the phase of the output of the phase calculator.
FIG. 16b is a timing chart showing an example of the phase of the output of the HPF.
FIG. 16c is a timing chart showing an example of the phase of the output of the moving deviation calculator.

FIG. 16 is a concept diagram of the output of the phase calculator 66, the output of the HPF 67, and the output of the moving deviation calculator 63 when the interference signal is superposed over the echo signal. The main difference in FIG. 16 from FIG. 15 is that the interference signal IS2 is present. The echo signal ES5 in FIG. 16 is similar to the echo signal ES4 in FIG. 15. Therefore, since the signals up to the distance D8 and from the distance D9 onward that appear in the phase calculator 66, the HPF 67, and the moving deviation calculator 63 as a result of the echo signal ES5 are similar to those in FIG. 15, they will not be described again.

As shown between the distance D3 and the distance D4 in FIG. 16a, beating occurs when an echo and interference are present at the same time, and a severe change in phase with a short period is observed in which the interference signal IS2 is superposed over the echo signal ES5. Therefore, as shown in FIG. 16*b*, if HPF processing is performed by the HPF 67 and the low frequency is cut out, then the interference signal IS2 will be emphasized with respect to the other signal components, such as the echo signal ES5. As a result, a standard deviation σ that can be differentiated from noise or the echo signal of other sweeps appears between the distance D3 and the distance D4 in the output of the moving deviation calculator 63.

Figure 17:
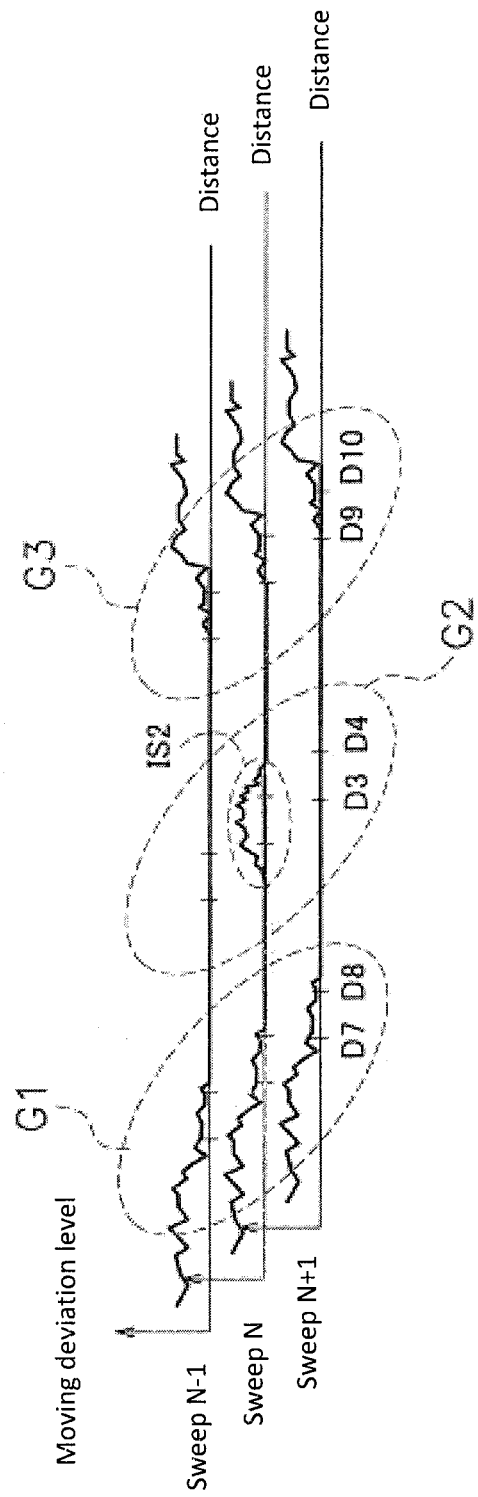
FIG. 17 is a timing chart illustrating the operation of a moving deviation comparator when there is radar interference.

FIG. 17 is a concept diagram illustrating the comparison of the standard deviation σ performed by the moving deviation comparator 65. The standard deviation σ for the N-th sweep shown in FIG. 17 corresponds to the output of the moving deviation calculator 63 shown in FIG. 16*c*. In FIG. 17, the N-th sweep is the target sweep for which interference is to be detected.

The group G1 shown in FIG. 17 is determined by the moving deviation comparator 65 not to include any interference because although there is a certain amount of standard deviation σ between the distance D7 and the distance D8, the standard deviation σ is about the same for the N−1-th, N-th, and N+1-th sweeps. This determination is similarly performed for the group G3. For the group G2 in which the target distance is between the distance D3 and the distance D4, only the standard deviation σ of the N-th sweep protrudes, so it can be concluded that interference has occurred between the distance D3 and the distance D4 of the N-th sweep.

More specifically, when the amplitude is under a preset lower limit for the target distance (distance D3 to D4) of the target sweep (the N-th sweep), comparison by the moving deviation comparator 65 is halted and it is concluded that no radar interference has been superposed. This prevents the comparison of sets of noise that can result in deviation with a large value, and the mistaken detection of the radar interference. The amplitude exceeds the lower limit between the distance D3 and the distance D4 shown in FIG. 17.

Next, the standard deviation σ for the target distance D3 to D4 of the target sweep (N-th) is compared to the average value for the standard deviation σ of the sweeps before and after at the same distance (N−1-th and N+1-th). If the standard deviation σ of the target distance of the target sweep is greater than the product of multiplying this average by an interference detection coefficient co, it is determined that the radar interference has been superposed. The interference detection coefficient co is a numerical value greater than one, such as 1.25. Here, a large standard deviation σ that accompanies the interference signal IS2 appears at the target distance D3 to D4 of the target sweep (N-th), but HPF processing brings the standard deviation σ of the echo signals ES4, ES5, and ES6 to almost zero.

Features

The moving deviation calculator 63 (change amount calculator) finds the standard deviation σ (change amounts) in the distance direction of the phase for eight sets of data sampled in the distance direction from the output of the HPF 67 for the phase at each sweep (from the phase of the complex received signals for the plurality of sweeps). The moving deviation comparator 65 (detector) uses the moving deviation memory 64 to compare the standard deviation σ calculated by the moving deviation calculator 63 for the plurality of sweeps, and detects the radar interference occurring between the eight sets of data (from the first distance to the second distance).

In the detection of radar interference occurring between the eight sets of data by the moving deviation comparator 65, since the standard deviation σ calculated by the moving deviation calculator 63 is compared for the plurality of sweeps, the variance in the distance direction in the phase that occurs when the interference signal has been superposed over the echo signal can be ascertained, and the interference signal can be detected, even when there is only a small difference between the amplitude of the echo signal and the amplitude of the interference signal.

With the pulse compression radar device 10B in FIG. 13, it is determined whether or not the disparity between the change amount in the target sweep (the N-th sweep) and the standard deviation (change amounts) in the sweeps other than the target sweep (the N−1-th and N+1-th sweeps) has exceeded the threshold, as shown in FIG. 17, for example. This disparity in the change amounts can be not only the simple difference in the change amount, but the difference between indices when comparing to proportion, change rate, or another such index.

With the pulse compression radar device 10B in FIG. 13, the increase in the change amount caused by superposition of the radar interference over the echo is detected from the variance in the phase. That is, the moving deviation calculator 63 becomes a variance calculator. The moving standard deviation is used as an index of variance. Accordingly, whether or not there is an interference signal can be reliably determined even though there is little change in the change amount caused by superposition of the radar interference over the echo.

The moving average deviation, the moving root mean square, the moving variance, the moving mean square, or the moving mean square can be used as an index of variance instead of the moving standard deviation in the distance direction.

With the pulse compression radar device 10B in FIG. 13, change other than the change amount due to superposition of the radar interference over the echo is suppressed by the HPF 67, making it easier to detect the interference signal.

Modification Example 2-1

In the second embodiment above, a case in which the pulse compression radar device 10B used the chirp signal was described, but the modulated pulse signal is not limited to the chirp signal.

Modification Example 2-2

In the second embodiment above, the phase of the received signal was obtained from the complex received signals detected by quadrature using the phase calculator 66, but the phase can instead be obtained by some other method. For example, the phase can be detected directly from an analog signal, and the method is not limited to finding the phase from the complex received signals I and Q.

Modification Example 2-3

In the second embodiment above, just as in the first embodiment, the method for determining that the change amount of the target sweep protruded beyond the change amount of other sweeps can be changed to some other method, such as finding the answer by a statistical method, finding the answer from the slope of a differentiated change amount, or using fuzzy logic.

Modification Example 2-4

In the second embodiment above, just as in the first embodiment, detection of the interference signal can be facilitated by another method instead of using the HPF 67 to suppress change other than the change amount caused by superposition of the radar interference over the echo.

Modification Example 2-5

In the second embodiment above, just as in the first embodiment, a suitable circuit integration method can be used to configure the signal processor 40, and the signal processor 40 can be realized by using a CPU to interpret and execute program data that can execute the above processing procedure and that is stored in a memory device as function blocks. This program data can be introduced into the memory device via a recording medium, or can be directly executed from the recording medium, which is the same as in the first embodiment above.

Modification Example 2-6

In the second embodiment above, just as in the first embodiment, as shown in FIG. 12, for example, data for the plurality of sweeps can be stored in the data memory 431 of the interference rejection device 43A, and processing performed by the interference detection device 60A using the data for the plurality of sweeps stored in the data memory 431.

Modification Example 2-7

Figure 14:
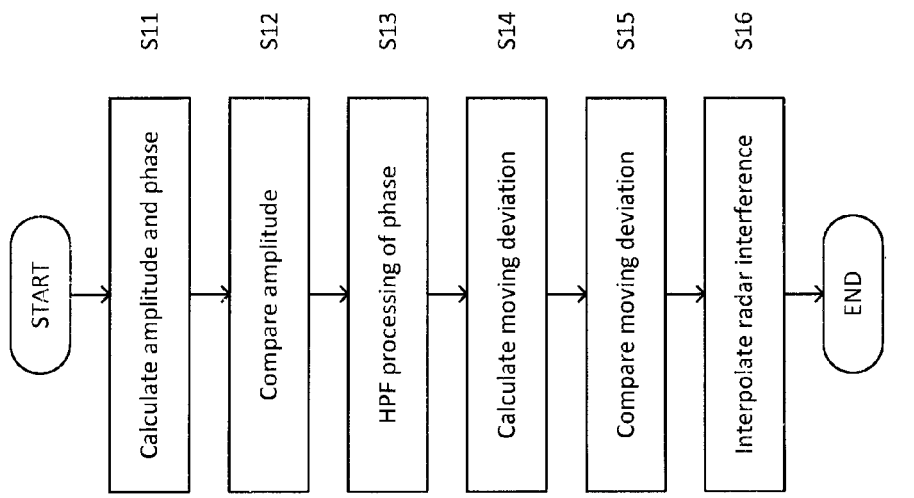
FIG. 14 is a flowchart illustrating a method for rejecting radar interference.

In the second embodiment above, as illustrated in the flowchart in FIG. 14, a case was described in which prior art was combined in the detection of the radar interference, but prior art can of course not be combined, and merely used singly. Also, the technique for combining in order to detect the radar interference is not limited to just that illustrated in FIG. 14.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An interference rejection device comprising:
a change amount calculator configured to find change amounts in at least one of amplitude and phase of received signals of a plurality of sweeps in a distance direction between a first distance and a second distance;
a detector configured to detect radar interference occurring between the first distance and the second distance while disparity between the change amount in a target sweep that is targeted as a detection object of the radar interference and the change amounts in sweeps other than the target sweep exceeds a threshold; and
a rejecter configured to suppress an interference component of the received signal corresponding to a position of the radar interference.

2. The interference rejection device according to claim 1, wherein
the detector is further configured to output an identification signal indicating that the radar interference occurs between the first distance and the second distance while a ratio of the change amount in a target sweep to an average value of the change amounts in sweeps before and after the target sweep exceeds a set value.

3. The interference rejection device according to claim 1, further comprising
an amplitude calculator configured to calculate amplitude of complex received signals obtained by quadrature detection for the plurality of sweeps,
the change amount calculator being further configured to find the change amounts in the amplitude in the distance direction between the first distance and the second distance with respect to the amplitude of the complex received signals calculated by the amplitude calculator.

4. The interference rejection device according to claim 1, further comprising
a phase calculator configured to calculate phase of complex received signals obtained by quadrature detection for the plurality of sweeps,
the change amount calculator being further configured to find the change amounts in the phase in the distance direction between the first distance and the second distance with respect to the phase of the complex received signals calculated by the phase calculator.

5. The interference rejection device according to claim 1, wherein
the rejecter is configured to reject the radar interference by changing complex received signals between the first distance and the second distance while the radar interference is detected by the detector.

6. An interference rejection device comprising:
a change amount calculator configured to find change amounts in at least one of amplitude and phase of received signals of a plurality of sweeps in a distance direction between a first distance and a second distance;
a detector configured to detect radar interference occurring between the first distance and the second distance by comparing the change amounts calculated by the change amount calculator between the plurality of sweeps; and
a rejecter configured to suppress an interference component of the received signal corresponding to a position of the radar interference; and
the change amount calculator has a variance calculator that is configured to calculate values indicating variance in the at least one of the amplitude and the phase of the received signals, and is configured to output the values indicating the variance in the at least one of the amplitude and the phase calculated by the variance calculator to the detector as the change amounts.

7. The interference rejection device according to claim 6, wherein
the variance calculator is configured to calculate one of moving standard deviation, moving average deviation, and moving variance in the distance direction as the values indicating the variance in the at least one of the amplitude and the phase.

8. The interference rejection device according to claim 6, wherein
the change amount calculator further has a high-pass filter that is configured to attenuate a frequency band lower than a specific cutoff frequency for the at least one of the amplitude and the phase of the received signals, and
the variance calculator is further configured to calculate the values indicating the variance of the received signals by using one of moving standard deviation, moving average deviation, moving root mean square, moving variance, and moving mean square in the distance direction as the values indicating the variance in the at least one of the amplitude and the phase with respect to the at least one of the amplitude and the phase outputted by the high-pass filter.

9. A radar device comprising:
an antenna configured to receive modulated signals reflected by a target for a plurality of sweeps;

a transceiver configured to output received signals corresponding to the modulated signals received by the antenna;

a change amount calculator configured to find change amounts in at least one of amplitude and phase of the received signals of the plurality of sweeps in a distance direction between a first distance and a second distance;

a detector configured to detect radar interference occurring between the first distance and the second distance while disparity between the change amount in a target sweep that is targeted as a detection object of the radar interference and the change amounts in sweeps other than the target sweep exceeds a threshold;

a rejecter configured to reject the radar interference detected by the detector; and a compressor configured to perform pulse compression on an output of the rejecter for demodulation of the modulated signals.

10. The radar device according to claim 9, wherein
the detector is further configured to output an identification signal indicating that the radar interference occurs between the first distance and the second distance while a ratio of the change amount in a target sweep to an average value of the change amounts in sweeps before and after the target sweep exceeds a set value.

11. The radar device according to claim 9, further comprising
an amplitude calculator configured to calculate amplitude of complex received signals obtained by quadrature detection for the plurality of sweeps,
the change amount calculator being further configured to find the change amounts in the amplitude in the distance direction between the first distance and the second distance with respect to the amplitude of the complex received signals calculated by the amplitude calculator.

12. The radar device according to claim 9, further comprising
a phase calculator configured to calculate phase of complex received signals obtained by quadrature detection for the plurality of sweeps,
the change amount calculator being further configured to find the change amounts in the phase in the distance direction between the first distance and the second distance with respect to the phase of the complex received signals calculated by the phase calculator.

13. The radar device according to claim 9, wherein
the rejecter is configured to reject the radar interference by changing complex received signals between the first distance and the second distance while the radar interference is detected by the detector.

14. A radar device comprising:
an antenna configured to receive modulated signals reflected by a target for a plurality of sweeps;
a transceiver configured to output received signals corresponding to the modulated signals received by the antenna;
a change amount calculator configured to find change amounts in at least one of amplitude and phase of the received signals of the plurality of sweeps in a distance direction between a first distance and a second distance;
a detector configured to detect radar interference occurring between the first distance and the second distance by comparing the change amounts calculated by the change amount calculator between the plurality of sweeps;
a rejecter configured to reject the radar interference detected by the detector; and
a compressor configured to perform pulse compression on an output of the rejecter for demodulation of the modulated signals; and
the change amount calculator has a variance calculator that is configured to calculate values indicating variance in the at least one of the amplitude and the phase of the received signals, and is configured to output the values indicating the variance in the at least one of the amplitude and the phase calculated by the variance calculator to the detector as the change amounts.

15. The radar device according to claim 14, wherein
the variance calculator is configured to calculate one of moving standard deviation, moving average deviation, and moving variance in the distance direction as the values indicating the variance in the at least one of the amplitude and the phase.

16. The radar device according to claim 14, wherein
the change amount calculator further has a high-pass filter that is configured to attenuate a frequency band lower than a specific cutoff frequency for the at least one of the amplitude and the phase of the received signals, and
the variance calculator is further configured to calculate the values indicating the variance of the received signals by using one of moving standard deviation, moving average deviation, moving root mean square, moving variance, and moving mean square in the distance direction as the values indicating the variance in the at least one of the amplitude and the phase with respect to the at least one of the amplitude and the phase outputted by the high-pass filter.

17. A target finding method comprising:
operating an antenna to receive modulated signals reflected by a target for a plurality of sweeps;
outputting received signals corresponding to the modulated signals received by the antenna;
operating a processor to determine change amounts in at least one of amplitude and phase of the received signals of the plurality of sweep in a distance direction between a first distance and a second distance;
operating the processor to detect radar interference occurring between the first distance and the second distance while disparity between the change amount in a target sweep that is targeted as a detection object of the radar interference and the change amounts in sweeps other than the target sweep exceeds a threshold;
operating the processor to reject the detected radar interference; and
operating the processor to perform pulse compression on an output after rejecting of the detected radar interference for demodulation of the modulated signal.

* * * * *